United States Patent
Hoshino et al.

(10) Patent No.: US 11,177,874 B2
(45) Date of Patent: Nov. 16, 2021

(54) SERVICE LINK ANTENNA CONFIGURATION AND BEAM FORMING CONTROL IN HAPS

(71) Applicant: HAPSMobile Inc., Tokyo (JP)

(72) Inventors: Kenji Hoshino, Tokyo (JP); Shoichi Sudo, Tokyo (JP); Yoshichika Ota, Tokyo (JP)

(73) Assignee: HAPSMobile Inc., Tokyo (JP)

(*) Notice: Subject to any disclaimer, the term of this patent is extended or adjusted under 35 U.S.C. 154(b) by 0 days.

(21) Appl. No.: 17/271,060

(22) PCT Filed: Aug. 7, 2019

(86) PCT No.: PCT/JP2019/031181
§ 371 (c)(1),
(2) Date: Feb. 24, 2021

(87) PCT Pub. No.: WO2020/045006
PCT Pub. Date: Mar. 5, 2020

(65) Prior Publication Data
US 2021/0258067 A1    Aug. 19, 2021

(30) Foreign Application Priority Data

Aug. 27, 2018   (JP) .............................. JP2018-158192

(51) Int. Cl.
*H03K 9/00*    (2006.01)
*H04B 7/185*   (2006.01)
(Continued)

(52) U.S. Cl.
CPC ......... *H04B 7/18504* (2013.01); *H01Q 21/20* (2013.01); *H04W 16/28* (2013.01)

(58) Field of Classification Search
CPC .... H04B 7/18504; H01Q 21/20; H04W 16/28
(Continued)

(56) References Cited

U.S. PATENT DOCUMENTS

2016/0046387 A1    2/2016  Frolov et al.
2016/0112116 A1    4/2016  Jalali et al.
2018/0054251 A1*   2/2018  Alex ....................... G01S 19/54

FOREIGN PATENT DOCUMENTS

WO    WO 2001/020719 A1    3/2001

OTHER PUBLICATIONS

Xu Xin, et al., "Compensative Mechanism Based on Steerable Antennas for High Altitude Platform Movement," Proceedings of 14th Youth Conference on Communication, Scientific Research, 2009.

* cited by examiner

*Primary Examiner* — Zewdu A Kassa
(74) *Attorney, Agent, or Firm* — Muirhead and Saturnelli, LLC

(57) ABSTRACT

Provided is an aerial-floating type communication relay apparatus capable of reducing a size and suppressing a movement of a cell footprint. The communication relay apparatus comprises an array antenna that has plural antenna elements forming a cell for performing a radio communication of a service link with a terminal apparatus, an information acquisition section that acquires information on at least one of a position and an attitude of the communication relay apparatus, and a control section that controls phases and amplitudes of plural transmission/reception signals transmitted/received via each of the plural antenna elements of the array antenna so as to fix the position of the cell footprint, based on the information on at least one of the position and the attitude of the communication relay apparatus.

12 Claims, 33 Drawing Sheets

(51) Int. Cl.
 *H01Q 21/20* (2006.01)
 *H04W 16/28* (2009.01)
(58) Field of Classification Search
 USPC .......................................... 375/316, 219, 295
 See application file for complete search history.

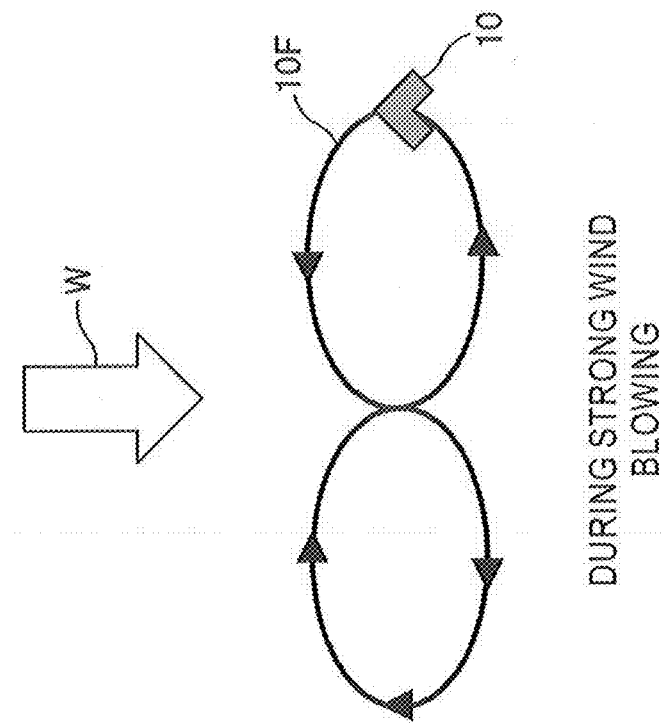
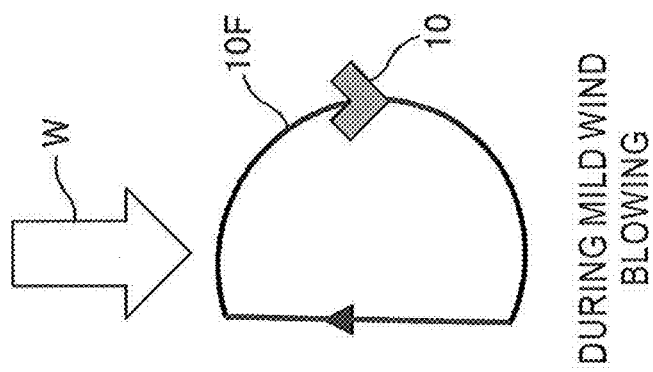
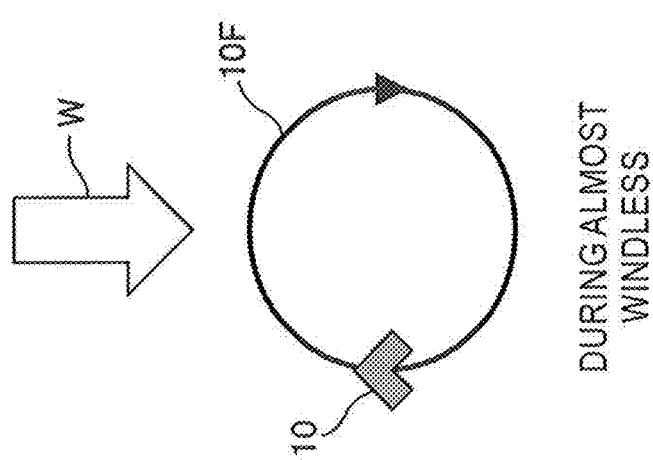

SERVICE LINK ANTENNA CONFIGURATION AND BEAM FORMING CONTROL IN HAPS

TECHNICAL FIELD

The present invention relates to an antenna configuration of a service link and a beamforming control in a radio relay apparatus such as HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

Non-Patent Literature

Non-Patent Literature 1: Hui Li, Xin Xu, Mingchuan Yang and Qing Guo, "Compensative mechanism based on steerable antennas for High Altitude Platform movement," 2011 6th International ICST Conference on Communications and Networking in China (CHINACOM), Harbin, 2011, pp. 870-874.

SUMMARY OF INVENTION

Technical Problem

In the above-mentioned aerial-floating type communication relay apparatus, when an attitude or a position changes due to an influence of airflow or atmospheric pressure in a stratosphere or the like where the communication relay apparatus is located, a cell footprint formed on the ground or the like moves. Therefore, a frequent occurrence of HO is assumed, in which many terminal apparatuses in a service area are simultaneously handed over (HO), and there is a possibility that control signals may increase due to the frequent occurrence of HO and a communication interruption may occur due to HO failures.

In Non-Patent Document 1, although a technique for fixing a cell footprint formed by a HAP by mechanically controlling a direction of an antenna of a HAP (high altitude platform) has been proposed, it is difficult to install it in a small communication relay apparatus because a control mechanism becomes large and heavy.

Solution to Problem

A communication relay apparatus according to an aspect of the present invention is an aerial-staying type communication relay apparatus for performing a radio communication with a terminal apparatus. The communication relay apparatus comprises an array antenna that has plural antenna elements forming a cell for performing a radio communication of a service link with the terminal apparatus, an information acquisition section that acquires information on at least one of a position and an attitude of the communication relay apparatus, and a control section that controls phases and amplitudes of plural transmission/reception signals transmitted/received via each of the plural antenna elements of the array antenna so as to fix a position of a cell footprint, based on the information on at least one of the position and the attitude of the communication relay apparatus acquired by the information acquisition section.

In the foregoing communication relay apparatus, the communication relay apparatus may form plural cells of configuring a service area and may control the phases and the amplitudes of the plural transmission/reception signals so as to fix each of footprints of the plural cells.

In the foregoing communication relay apparatus, the array antenna may be a cylinder-type array antenna in which plural antenna elements are disposed to be distributed along a cylindrical peripheral surface shape.

In the foregoing communication relay apparatus, the cylinder-type array antenna may be configured with plural sets of circular array antennas disposed in a direction parallel to a central axis of the cylindrical peripheral surface shape, in which each of the circular array antennas has plural antenna elements disposed in a circumferential direction of the cylindrical peripheral surface shape.

In the foregoing communication relay apparatus, the communication relay apparatus may obtain a target horizontal angle of an antenna directional beam from a predetermined vertical plane and a target vertical angle of the antenna directional beam from a predetermined horizontal plane so as to fix the cell footprint with reference to an orientation of a reference direction preset in the communication relay apparatus, and the communication relay apparatus may control the phases and the amplitudes of the plural transmission/reception signals may be controlled independently of each other, for each of the circular-type array antenna having the plural antenna elements disposed in the circumferential direction of the cylindrical peripheral surface shape and the linear-type array antenna having the plural antenna elements disposed in the direction parallel to the central axis of the cylindrical peripheral surface shape.

In the foregoing communication relay apparatus, plural antenna elements may be further disposed on a bottom surface portion of the cylinder-type array antenna.

In the foregoing communication relay apparatus, the array antenna may be a circular-type array antenna having plural antenna elements disposed so as to be distributed plural along a circumferential shape.

In the foregoing communication relay apparatus, the communication relay apparatus may obtain a target horizontal angle of an antenna directional beam from a predetermined vertical plane so as to fix the cell footprint with reference to an orientation in a reference direction preset in the communication relay apparatus, calculate a weight applied to each of the plural transmission/reception signals for the plural antenna elements, based on the target horizontal angle and a desired beam pattern, and control the phases and the amplitudes of the plural transmission/reception signals based on the plural weights.

In the foregoing communication relay apparatus, the communication relay apparatus may store an approximate equation of phases and amplitudes of weights predetermined so as to obtain a desired beam pattern with respect to plural horizontal angles of an antenna directional beam from a predetermined vertical plane with reference to an orientation in a reference direction preset in the communication relay apparatus, obtain a target horizontal angle of an antenna directional beam from a predetermined vertical plane so as to fix the cell footprint with reference to the orientation in the reference direction, calculate a weight applied to each of the plural transmission/reception signals for the plural antenna elements, based on the target horizontal angle and the approximate equation, and control the phases and the amplitudes of the plural transmission/reception signals based on the plural weights.

In the foregoing communication relay apparatus, the communication relay apparatus may obtain a target horizontal angle of an antenna directional beam from a predetermined vertical plane so as to fix the cell footprint with reference to an orientation in a reference direction preset in the communication relay apparatus, calculate a weight applied to each of the plural transmission/reception signals for the plural antenna elements by the Gaussian distribution function centered on the target horizontal angle, based on the target horizontal angle, and control the phases and the amplitudes of the plural transmission/reception signals based on the plural weights.

In the foregoing communication relay apparatus, the weight may be set to zero for an antenna element on a back side located on a side opposite to the target horizontal angle.

In the foregoing communication relay apparatus, the array antenna may be configured by disposing plural planar array antennas, in which plural antenna elements are disposed so as to be two-dimensionally distributed along a planar shape, so that a beam direction of each of the array antenna is different from each other, and may include an antenna switching section for switching the array antenna used for forming the cell between the plural planar array antennas.

In the foregoing communication relay apparatus, the planar array antenna may be disposed on each of plural outer surface sections in a pyramid shape, a prism shape, or a combination thereof.

In the foregoing communication relay apparatus, the communication relay apparatus may obtain a target horizontal angle of an antenna directional beam from a predetermined vertical plane and a target vertical angle of the antenna directional beam from a predetermined horizontal plane so as to fix the cell footprint with reference to an orientation in a reference direction preset in the communication relay apparatus. The communication relay apparatus may further perform a control of the phases and amplitudes of the transmission/reception signals with respect to the planar array antenna in use, when a difference between the current horizontal angle and the target horizontal angle is less than or equal to a predetermined threshold value, and may further switch the planar array antenna and perform the control of the phases and the amplitudes of the transmission/reception signals, when the difference between the current horizontal angle and the target horizontal angle becomes larger than the threshold value.

In the foregoing communication relay apparatus, the communication relay apparatus may calculate and store weights applied to the transmission/reception signals in advance by corresponding to each of multiple sets of positions and attitudes that are different from each other in a predicted movement path of the communication relay apparatus with respect to a position of the service area. The communication relay apparatus may select a weight corresponding to the position and the attitude of the communication relay apparatus, the position and the attitude being acquired by the information acquisition section, from the stored weights respectively corresponding to the multiple sets of the absolute positions and attitudes, and perform a control of the phases and amplitudes of the transmission/reception signals based on the selected weights.

Advantageous Effects of Invention

According to the present invention, it is possible to reduce a size of an aerial-floating type communication relay apparatus and suppress a movement of a cell footprint configuring a service area.

BRIEF DESCRIPTION OF DRAWINGS

FIG. 12A is an illustration showing an example of a turning pattern of a HAPS.

FIG. 12B is an illustration showing an example of a turning pattern of a HAPS.

FIG. 12C is an illustration showing an example of a turning pattern of a HAPS.

DESCRIPTION OF EMBODIMENTS

Hereinafter, embodiments of the present invention are described with reference to the drawings.

Figure 1:
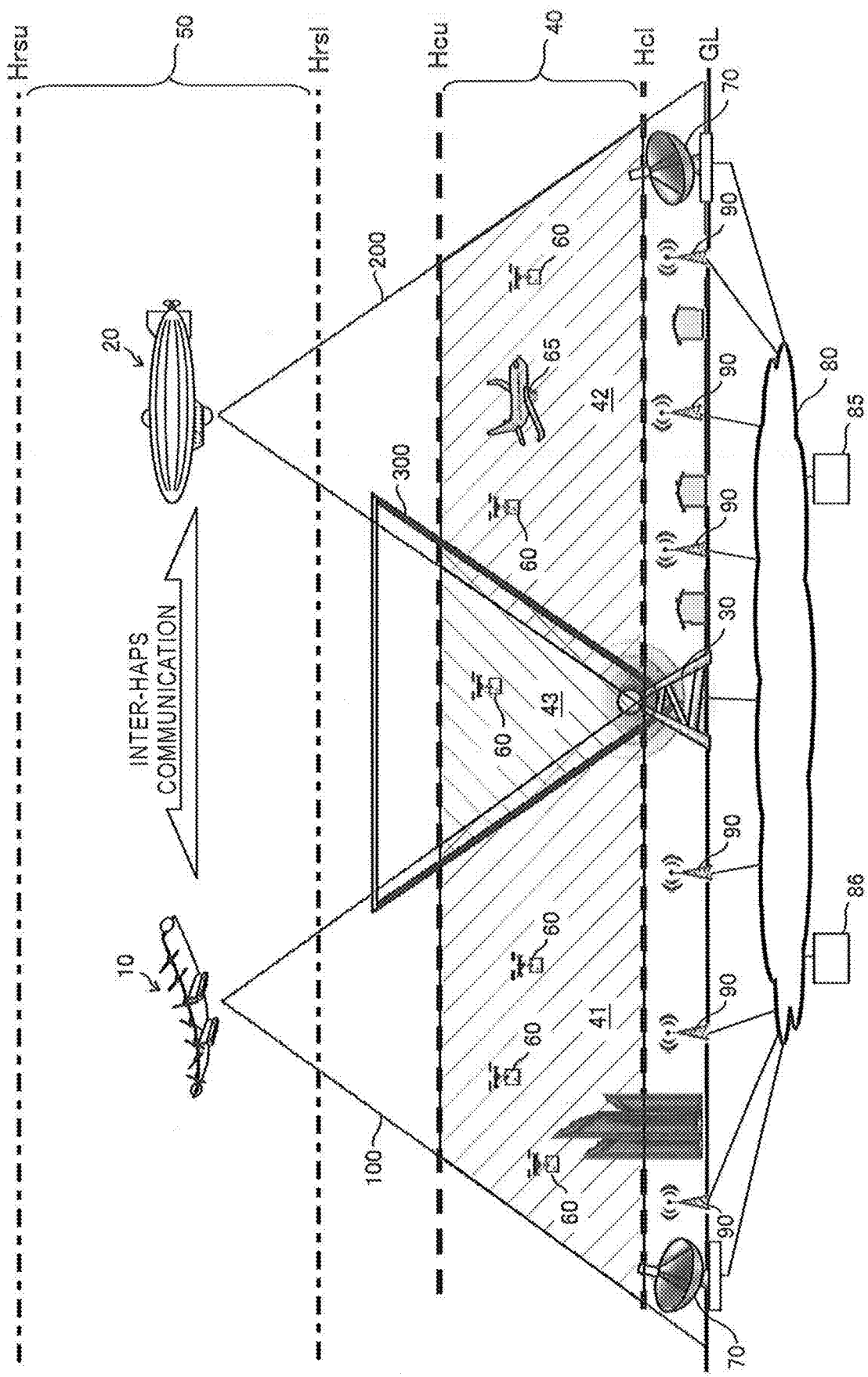
FIG. 1 is a schematic configuration diagram showing an example of an overall configuration of a communication system that realizes a three-dimensional network according to an embodiment of the present invention.

FIG. 1 is a schematic configuration diagram showing an example of an overall configuration of a communication system according to an embodiment of the present invention.

The communication system according to the present embodiment is suitable for realizing a three-dimensional network for mobile communications of the fifth generation or the next and subsequent generations after the fifth generation, which supports a simultaneous connection to a large number of terminal apparatuses, low delay method, etc. It is noted that, mobile communication standards applicable to communication systems, relay communication stations, base stations, repeaters and terminal apparatuses disclosed herein include the mobile communication standard of the fifth generation and the mobile communication standards of the next and subsequent generations after the fifth generation.

As shown in FIG. 1, the communication system is provided with High-Altitude Platform Stations (HAPS) 10 and 20 as plural aerial-floating type communication relay apparatuses (radio relay apparatuses). The HAPSs 10 and 20 are located in an airspace at a predetermined altitude, and form three-dimensional cells (three-dimensional areas) 41 and 42 as indicated by hatching areas in the figure in a cell-formation target airspace 40 at a predetermined altitude. The HAPSs 10 and 20 are those in which relay communication stations are mounted on floating objects (for example, solar plane, airship) that are controlled by autonomous control or external control so as to float or fly and be located in an airspace (floating airspace) 50 with high altitude of 100 [km] or less from the ground level or the sea level.

The airspace 50 in which the HAPSs 10 and 20 are located is, for example, a stratospheric airspace with altitude greater than 11 [km] and less than 50 [km] on the ground (or on the water such as the sea or lake). The airspace 50 may be an airspace in an altitude of 15 [km] or more and 25 [km] or less where weather conditions are relatively stable, and may be an airspace with altitude of about 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or two or more HAPSs according to the communication system in the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation spatial area near the ground level covered by a base station (for example, LTE eNodeB) 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell in the present embodiment is formed may be an airspace over the sea, a river, or a lake.

The relay communication stations of the HAPSs 10 and 20 respectively form beams 100 and 200 toward the ground for wirelessly communicating with a terminal apparatus that is a mobile station. The terminal apparatus may be a communication terminal module incorporated in a drone 60 that is an aircraft such as a small helicopter capable of remotely steering, or may be a user apparatus used by a user in an airplane 65. The spatial areas through which the beams 100 and 200 pass in the cell-formation target airspace 40 are three-dimensional cells 41 and 42. The plural beams 100 and 200 adjacent to each other in the cell-formation target airspace 40 may be partially overlapped with each other.

Each of the relay communication stations of the HAPSs 10 and 20 is, for example, a base station that wirelessly communicates with a gateway station (also referred to as a "feeder station") 70 as a relay station connected to a core network on the ground (or on the sea) side, or a slave repeater that wirelessly communicates with the feeder station (master repeater) 70 as a relay station connected to the base station on the ground (or on the sea) side. Each of the relay communication stations of the HAPSs 10 and 20 is connected to a core network of a mobile communication network 80 via the feeder station 70 installed on the ground or on the sea. A communication between the HAPSs 10 and 20 and the feeder station 70 may be performed by a radio communication with radio waves such as microwaves, or may be performed by an optical communication using a laser light or the like.

Each of the HAPSs 10 and 20 may autonomously control its own floating movement (flight) and a process in the relay communication station, by executing a control program with a control section including a computer or the like incorporated inside of the HAPS. For example, each of the HAPSs 10 and 20 may acquire its own current position information (for example, GPS position information), position control information (for example, flight schedule information) stored in advance, position information on another HAPS located in a peripheral space or the like, and may autonomously control floating movement (flight) and process in the relay communication station based on these pieces of information.

The floating movement (flight) and the process in the relay communication station of each of the HAPSs 10 and 20 may be controlled by a management apparatus 85 (also referred to as a "remote control apparatus") as a management apparatus provided in a communication center or the like of the mobile communication network 80. The management apparatus 85 can be configured by, for example, a computer apparatus such as a PC, a server, or the like. In this case, the HAPSs 10 and 20 may incorporate a communication terminal apparatus (for example, mobile communication module) for control so as to be able to receive control information from the management apparatus 85 and transmit various information such as monitoring information to the management apparatus 85, and may be assigned terminal identification information (for example, IP address, telephone number, etc.) so that the HAPSs 10 and 20 can be identified from the management apparatus 85. The MAC address of the communication interface may be used for identification of the communication terminal apparatus for control. Moreover, each of the HAPSs 10 and 20 may transmits information regarding the floating movement (flight) of the own HAPS or a surrounding HAPS and/or the process at the relay communication station, and monitoring information such as information on statuses of the HAPSs 10 and 20 and observation data acquired by various kinds of sensors, to a predetermined destination such as the management apparatus 85. The control information may include target-flight route information on the HAPS. The monitoring information may include at least one of information on current positions, flight-route history information, velocity relative to the air, velocity relative to the ground and propulsion direction of the HAPSs 10 and 20, wind velocity and wind direction around the HAPSs 10 and 20, and atmospheric pressure and temperature around the HAPSs 10 and 20.

In the cell-formation target airspace 40, there is a possibility that a spatial area (spatial area where the three-dimensional cells 41 and 42 are not formed) where the beams 100 and 200 of the HAPSs 10 and 20 do not pass may be occur. In order to complement this spatial area, as shown in the configuration example in FIG. 1, a base station (hereinafter referred to as "ATG station") 30 for forming an ATG (Air To Ground) connection by forming a three-dimensional cell 43 by forming a radial beam 300 from the ground or the sea side upward may be provided.

Further, by adjusting positions of HAPSs 10 and 20 and divergence angles (beam width) of the beams 100 and 200, etc. without using the ATG station 30, the relay communication stations of HAPSs 10 and 20 may form beams 100 and 200 that cover an entirety of an upper end surface of the cell-formation target airspace 40 so that three-dimensional cells are formed all over the cell-formation target airspace 40.

It is noted that, the three-dimensional cell formed by the HAPSs 10 and 20 may be formed so as to reach the ground or the sea surface so that it can communicate with a terminal apparatus located on the ground or on the sea.

Figure 2:
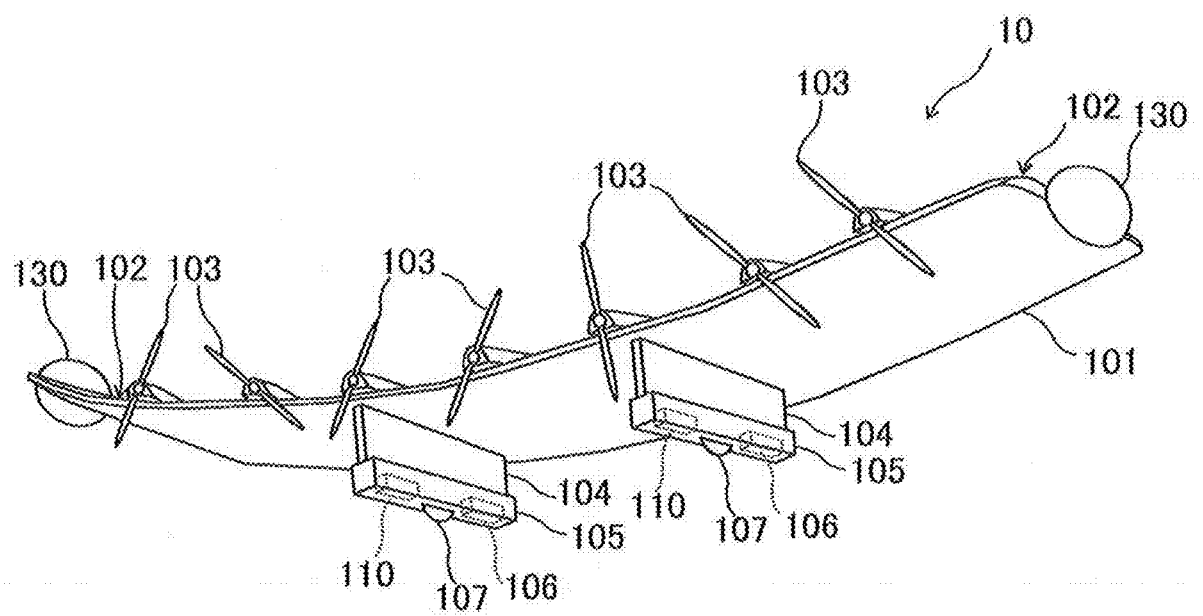
FIG. 2 is a perspective view showing an example of a HAPS used in the communication system in the embodiment.

FIG. 2 is a perspective view showing an example of the HAPS 10 used in a communication system in the embodiment.

The HAPS 10 in FIG. 2 is a solar-plane type HAPS, and has a main wing section 101 with both ends curved upward in the longitudinal direction, and a plurality of motor-driven propellers 103 as propulsion apparatuses of a bus-motive power system provided at one end edge portion of the main wing section 101 in the short direction. A solar power generation panel (hereinafter, referred to as "solar panel") 102 as a solar-photovoltaic power generator section having a solar-photovoltaic power generation function is provided on an upper surface of the main wing section 101. Pods 105 as plural apparatus accommodating sections for accommodating the mission equipment are connected to the two positions in the longitudinal direction of the lower surface of the main wing section 101 via a plate-like connecting section 104. Inside each pod 105, a relay communication station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay process by the relay communication station 110 is executed.

The solar-plane type HAPS 10 can float with lift force by, for example, performing a turning flight in a circular shape, performing a flight along a figure of "D", or performing a flight along a figure of "8" based on a predetermined target flight route, and can float to stay in a predetermined range in the horizontal direction at a predetermined altitude. It is noted that, the solar-plane type HAPS 10 can also fly like a glider when the propeller 103 is not rotationally driven. For example, the solar-plane type HAPS 10 can rise to a high position when electric power of the battery 106 is surplus by power generation of the solar panel 102 such as in daytime, and can fly like a glider by stopping the power supply from the battery 106 to the motor when an electric power cannot be generated by the solar panel 102, such as at night.

The HAPS 10 also includes an optical antenna apparatus 130 with a three-dimensionally corresponding directivity as a communication section used for an optical communication with another HAPS or an artificial satellite. It is noted that, although the optical antenna apparatuses 130 are disposed at both ends in the longitudinal direction of the main wing section 101 in the example in FIG. 2, the optical antenna apparatuses 130 may be disposed at other positions of the HAPS 10. It is also noted that, the communication section used for optical communication with the other HAPS or the artificial satellite is not limited to that of performing such optical communication, and the communication may be a radio communication by another method such as radio communication with radio waves such as microwaves.

Figure 3:
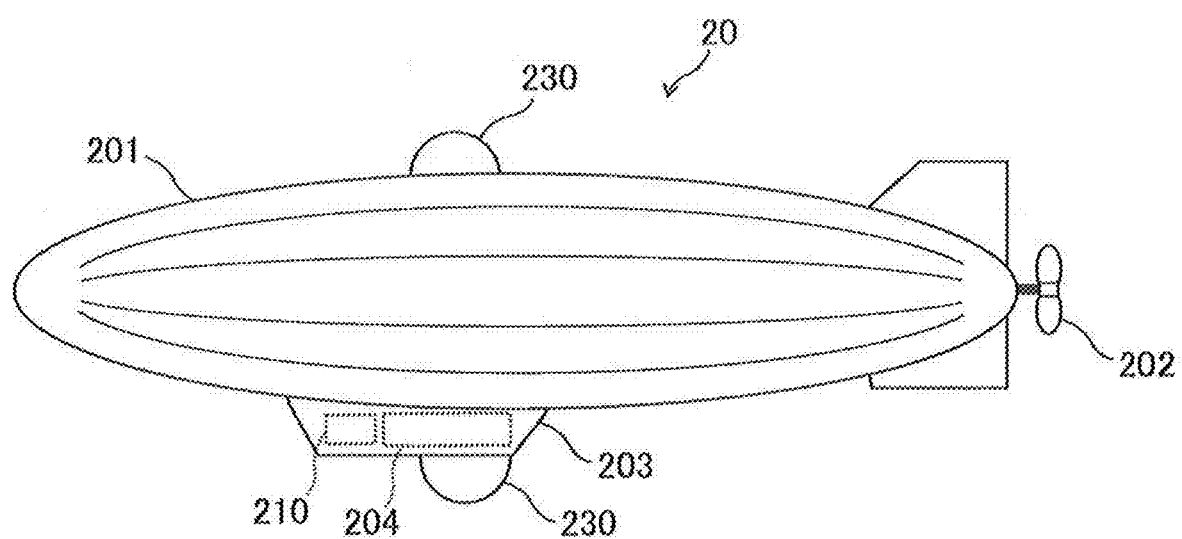
FIG. 3 is a side view showing another example of a HAPS used in the communication system in the embodiment.

FIG. 3 is a perspective view showing another example of the HAPS 20 used in a communication system in the embodiment.

The HAPS 20 in FIG. 3 is an unmanned-airship type HAPS, and can mount a large capacity battery since the payload is large. The HAPS 20 includes an airship body 201 filled with gas such as helium gas for floating by buoyancy, motor-driven propellers 202 as propulsion apparatuses of bus-motive power system, and an equipment accommodating section 203 in which mission equipment is accommodated. A relay communication station 210 and a battery 204 are accommodated in the equipment accommodating section 203. The motor of the propeller 202 is rotationally driven by an electric power supplied from the battery 204, and a radio relay process by the relay communication station 210 is executed.

It is noted that, a solar panel having a photovoltaic power generation function may be provided on the upper surface of the airship body 201, and the electric power generated by the solar panel may be stored in the battery 204.

The unmanned airship type HAPS 20 also includes an optical antenna apparatus 230 with a three-dimensionally corresponding directivity as a communication section used for an optical communication with another HAPS or an artificial satellite. It is noted that, although the optical antenna apparatus 230 is disposed on the upper surface of the airship body 201 and the lower surface of the equipment accommodating section 203 in the example in FIG. 3, the optical antenna apparatus 230 may be disposed on other parts of the HAPS 20. It is also noted that, the communication section used for optical communication with the other HAPS or the artificial satellite is not limited to that of performing such optical communication, and the communication may be a radio communication by another method such as a radio communication with radio waves such as microwaves.

Figure 4:
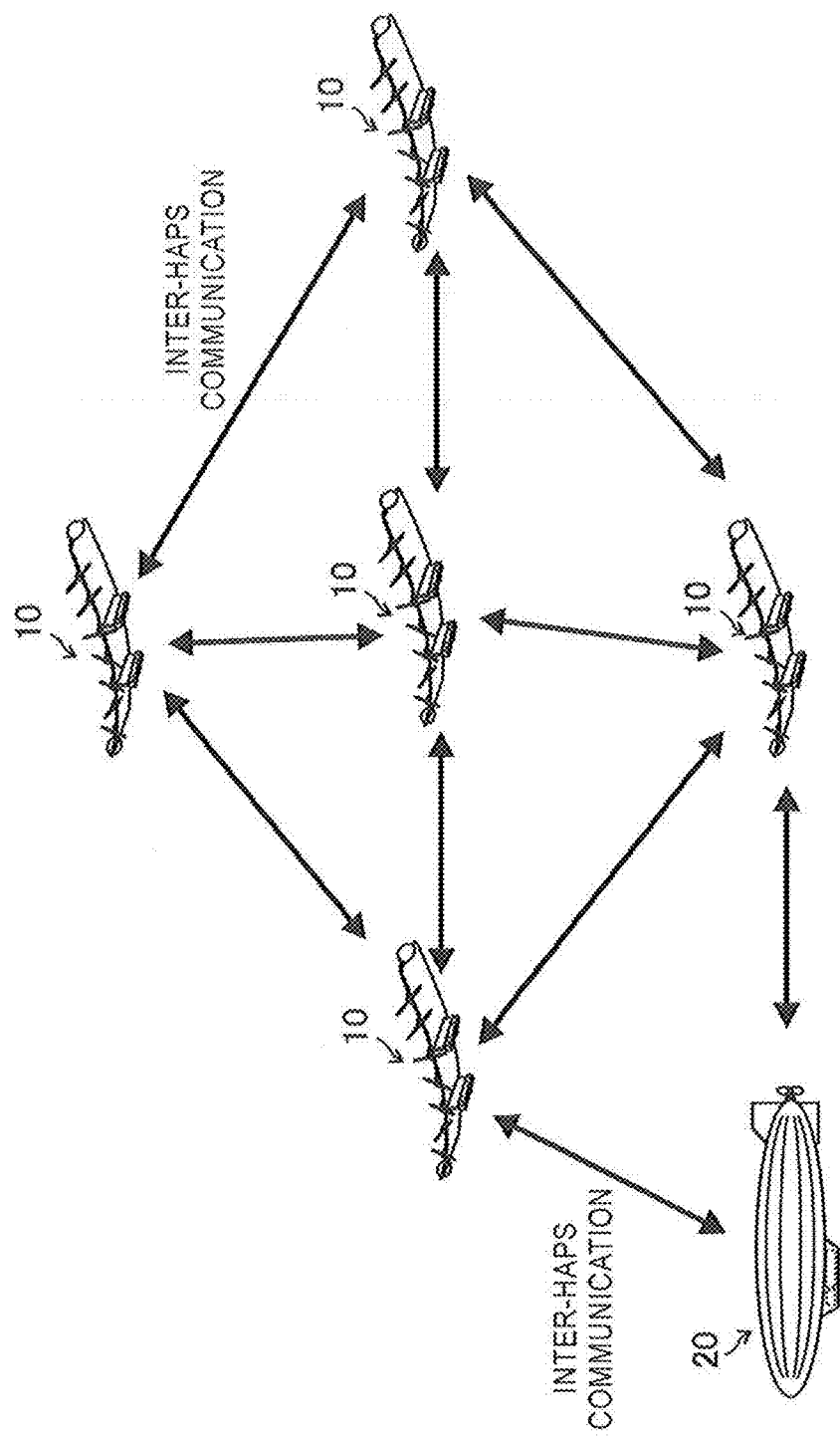
FIG. 4 is an illustration showing an example of a radio network formed in an upper airspace by plural HAPSs in the embodiment.

FIG. 4 is an illustration showing an example of a radio network formed in an upper airspace by plural HAPSs 10 and 20 in the embodiment.

The plural HAPSs 10 and 20 are configured to be capable of performing an inter-HAPS communication with each other by the optical communication in the upper airspace, and form a radio communication network having excellent robustness, which can stably realize a three-dimensional network over a wide area. This radio communication network can also function as an ad hoc network by a dynamic routing according to various environments and various information. The foregoing radio communication network can be formed to have various two-dimensional or three-dimensional topologies, and may be, for example, a mesh-type radio communication network as shown in FIG. 4.

Figure 5:
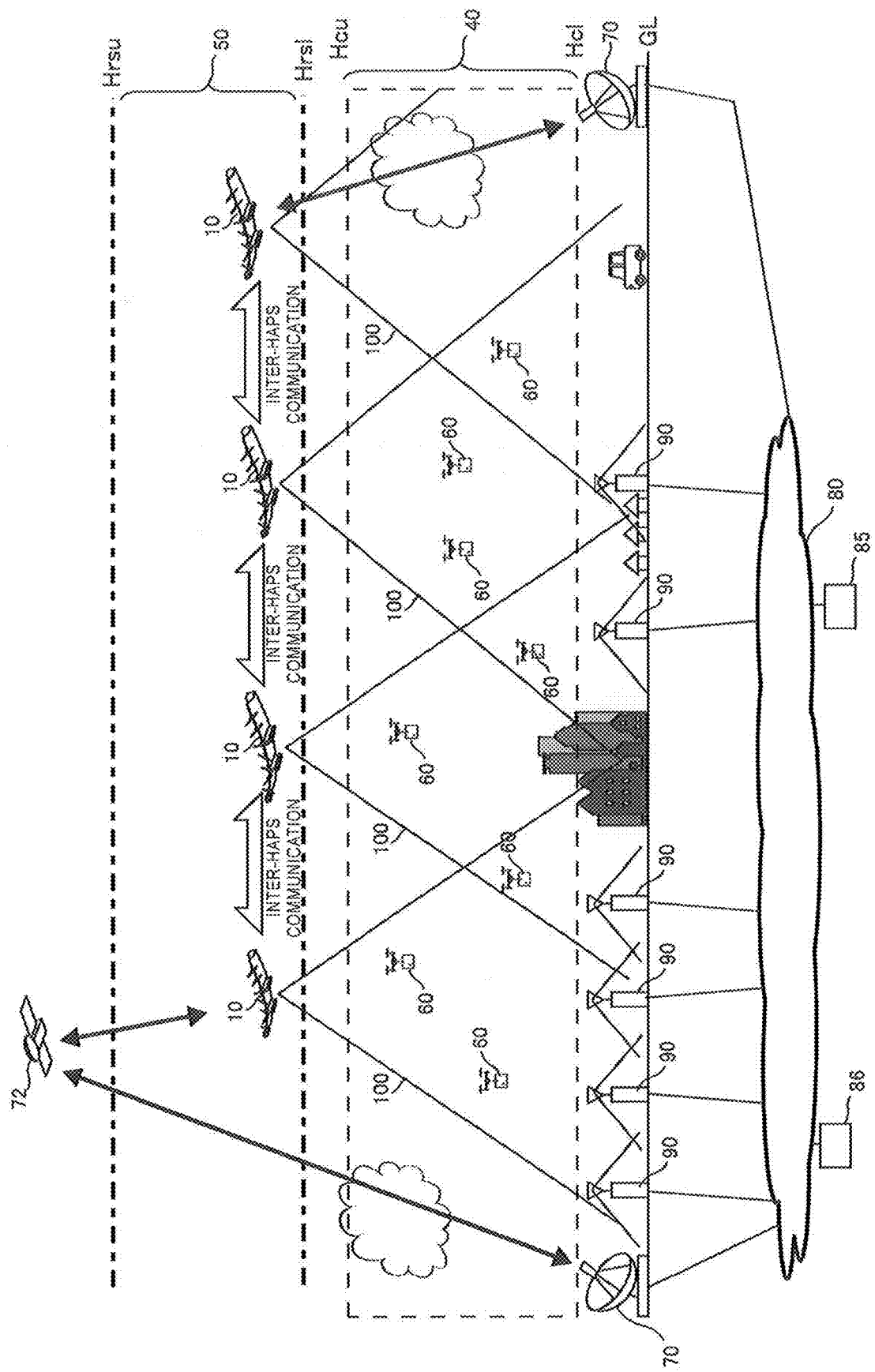
FIG. 5 is a schematic configuration diagram showing an example of an overall configuration of a communication system that realizes a three-dimensional network according to yet another embodiment.

FIG. 5 is a schematic configuration diagram showing an example of an overall configuration of a communication system according to another embodiment.

It is noted that, in FIG. 5, configuration elements similar to those in FIG. 1 described above are denoted by the same reference numerals and explanations thereof are omitted.

In the embodiment of FIG. 5, a communication between the HAPS 10 and the core network of the mobile communication network 80 is performed via the feeder station 70 and a low-orbital artificial satellite 72. In this case, a communication between the artificial satellite 72 and the feeder station 70 may be performed by a radio communication with radio waves such as microwaves, or may be performed by an optical communication using a laser light or the like. A communication between the HAPS 10 and the artificial satellite 72 is performed by an optical communication using a laser light or the like.

Figure 6:
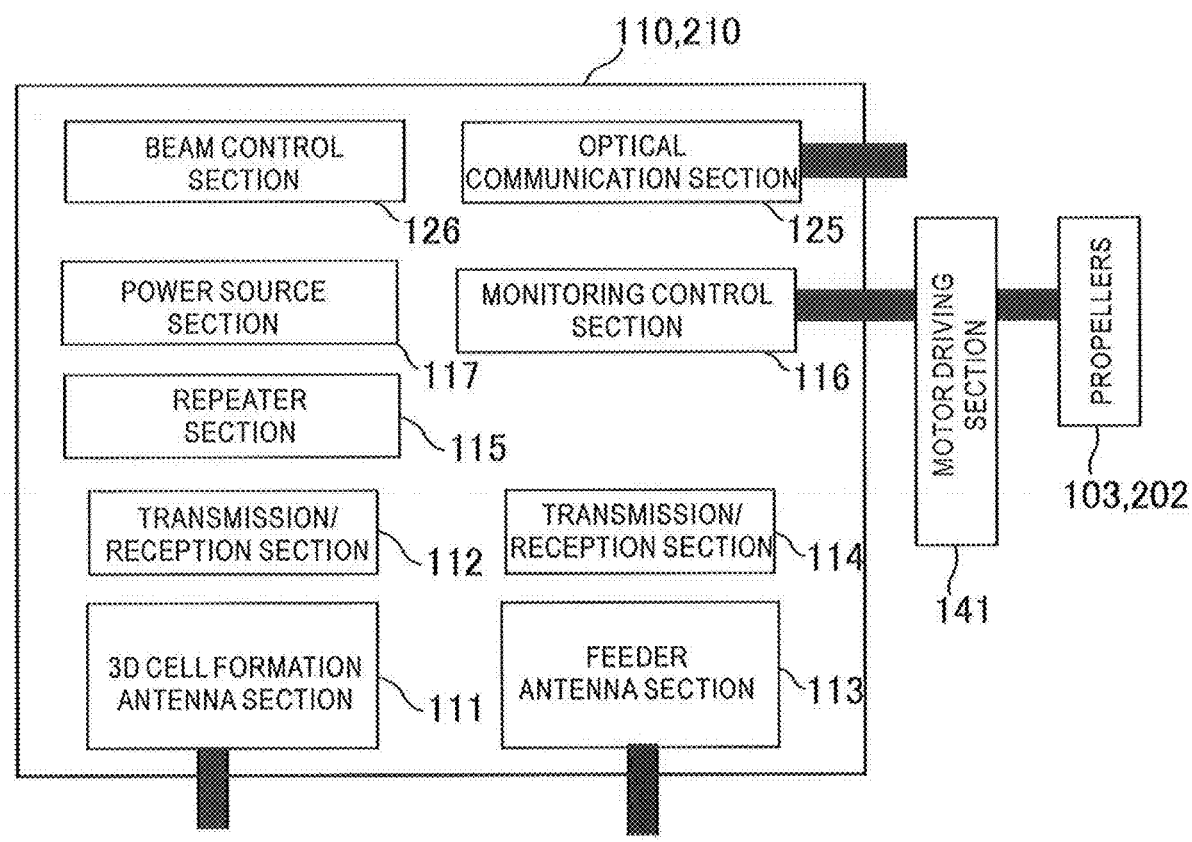
FIG. 6 is a block diagram showing a configuration example of a relay communication station of a HAPS in the embodiment.

FIG. 6 is a block diagram showing a configuration example of the relay communication stations 110 and 210 of the HAPSs 10 and 20 in the embodiment.

The relay communication stations 110 and 210 in FIG. 6 are examples of repeater-type of relay communication stations. Each of the relay communication stations 110 and 210 includes a 3D cell-formation antenna section 111, a transmission/reception section 112, a feeder antenna section 113, a transmission/reception section 114, a repeater section 115, a monitoring control section 116, and a power source section 117. Furthermore, each of the relay communication stations 110 and 210 includes an optical communication section 125 used for the inter-HAPS communication and the like, and a beam control section 126.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 constitutes a first radio communication section together with the 3D cell-formation antenna section 111, has a transmission/reception duplexer (DUP: DUPlexer) and an amplifier, etc., transmits radio signals to the terminal apparatuses located in the three-dimensional cells 41 and 42 and receives radio signals from the terminal apparatuses via the 3D cell-formation antenna section 111.

The feeder antenna section 113 has a directional antenna for performing radio communication with the feeder station 70 on the ground or on the sea. The transmission/reception section 114 constitutes a second radio communication section together with the feeder antenna section 113, has a transmission/reception duplexer (DUP: DUPlexer) and an amplifier, etc., and transmits/receives radio signals to/from the feeder station 70 via the feeder antenna section 113.

The repeater section 115 relays signals of the transmission/reception section 112 transmitted and received between the terminal apparatus, and signals of the transmission/reception section 114 transmitted and received between the feeder station 70. The repeater section 115 has an amplifier function for amplifying a relay target signal of a predetermined frequency to a predetermined level. The repeater section 115 may have a frequency conversion function for converting a frequency of the relay target signal.

The monitoring control section 116 is configured with, for example, a CPU and a memory, etc., and monitors an operation processing status of each section in the HAPSs 10 and 20 and controls each section, by executing a preinstalled program. In particular, the monitoring control section 116 controls a motor driving section 141 that drives the propellers 103 and 202 to move the HAPSs 10 and 20 to target positions, and controls the HAPSs 10 and 20 to stay in the vicinity of the target positions, by executing a control program.

The power source section 117 supplies the electric power outputted from the batteries 106 and 204 to each section in the HAPSs 10 and 20. The power source section 117 may have a function for storing the electric power generated by the solar power generation panel or the like and an electric power supplied from the outside in the batteries 106 and 204.

The optical communication section 125 communicates with surrounding other HAPSs 10 and 20 or artificial satellite 72 via an optical communication medium such as laser light. This communication enables a dynamic routing that dynamically relays a radio communication between the terminal apparatus such as the drone 60 and the mobile communication network 80, and can enhance the robustness of the mobile communication system by backing up and relaying wirelessly with the other HAPSs when one of the HAPSs fails.

The beam control section 126 controls a direction and intensity of a beam of laser light or the like used for the inter-HAPS communication or the communication with the artificial satellite 72, and performs a control so as to switch another HAPS (relay communication station) that performs a communication by an optical beam such as a laser light according to a change in relative position with neighboring another HAPS (relay communication station). This control may be performed based on, for example, a position and an attitude of the HAPS itself, a position of the surrounding HAPS and the like. Information on the position and the attitude of the HAPS itself may be acquired based on output of a GPS receiver, a gyro sensor, an acceleration sensor and the like incorporated in the HAPS, and information on the position of the surrounding HAPS may be acquired from the management apparatus 85 provided in the mobile communication network 80, or a server 86 such as HAPS management server and application server.

Figure 7:
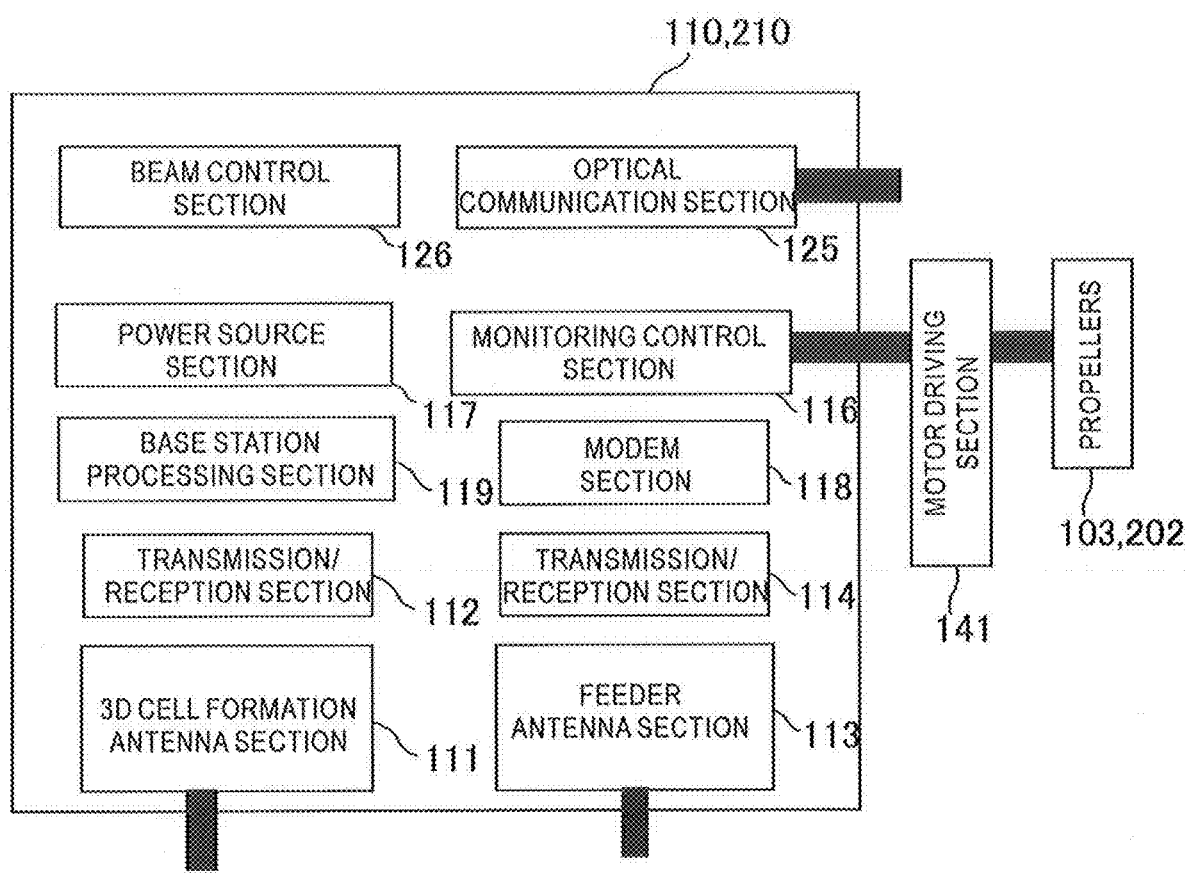
FIG. 7 is a block diagram showing another configuration example of a relay communication station of a HAPS in the embodiment.

FIG. 7 is a block diagram showing another configuration example of the relay communication stations 110 and 210 of the HAPSs 10 and 20 in the embodiment.

The relay communication stations 110 and 210 in FIG. 7 are examples of base-station type of relay communication stations.

It is noted that, in FIG. 7, configuration elements similar to those in FIG. 6 are denoted by the same reference numerals and explanations thereof are omitted. Each of the relay communication stations 110 and 210 in FIG. 7 further includes a modem section 118, and includes a base-station processing section 119 instead of the repeater section 115. Further, each of the relay communication stations 110 and 210 includes the optical communication section 125 and the beam control section 126.

The modem section 118, for example, performs a demodulation processing and a decoding processing for a reception signal received from the feeder station 70 via the feeder antenna section 113 and the transmission/reception section 114, and generates a data signal to be outputted to the base-station processing section 119 side. The modem section 118 performs an encoding processing and a modulation processing for the data signal received from the base-station processing section 119 side, and generates a transmission signal to be transmitted to the feeder station 70 via the feeder antenna section 113 and the transmission/reception section 114.

The base-station processing section 119 has, for example, a function as an e-NodeB that performs baseband processing based on a method conforming to the standard of LTE/LTE-Advanced. The base-station processing section 119 may process in a method conforming to a future standard of mobile communication such as the fifth generation.

The base-station processing section 119, for example, performs a demodulating process and a decoding process for a reception signal received from a terminal apparatus located in the three-dimensional cells 41 and 42 via the 3D cell-formation antenna section 111 and the transmission/reception section 112, and generates a data signal to be outputted to the modem section 118 side. The base-station processing section 119 performs an encoding process and a modulating process for the data signal received from the modem section 118 side, and generates a transmission signal to be transmitted to the terminal apparatus in the three-dimensional cells 41 and 42 via the 3D cell-formation antenna section 111 and the transmission/reception section 112.

Figure 8:
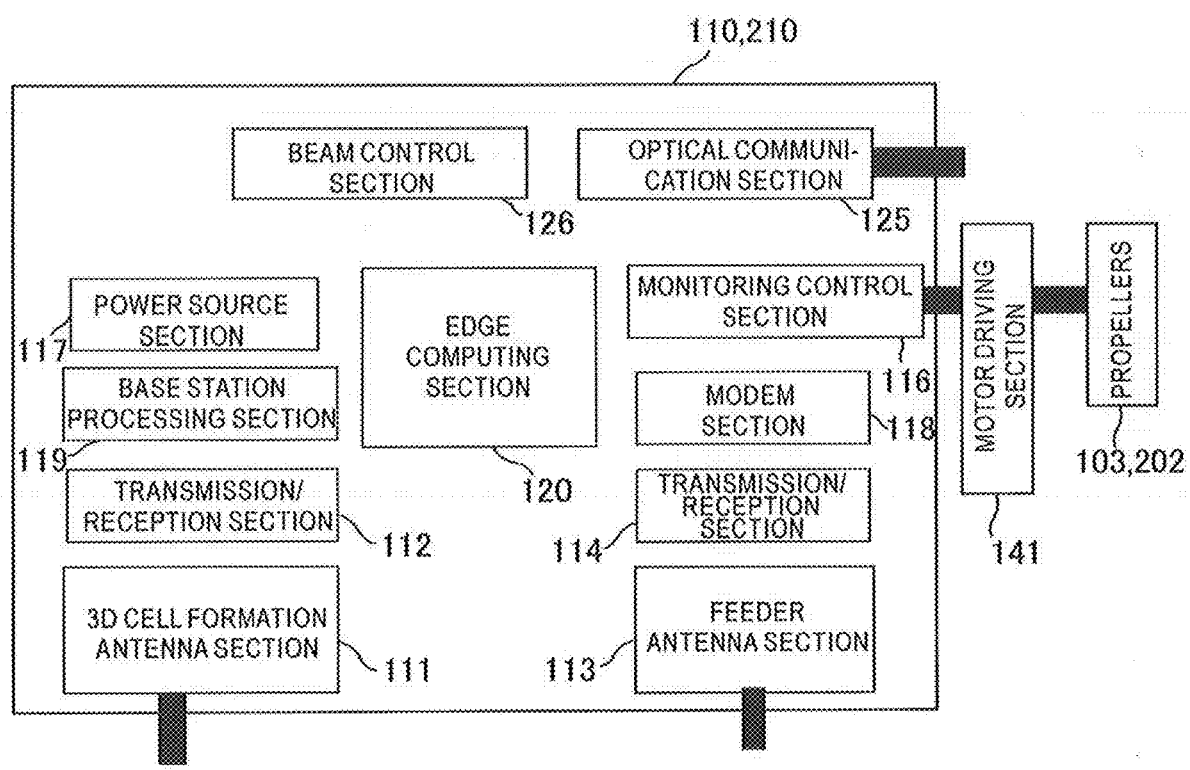
FIG. 8 is a block diagram showing yet another configuration example of a relay communication station of a HAPS in the embodiment.

FIG. 8 is a block diagram showing yet another configuration example of the relay communication stations 110 and 210 of the HAPSs 10 and 20 in the embodiment.

The relay communication stations 110 and 210 in FIG. 8 are examples of high-performance base-station type of relay communication stations having an edge computing function. It is noted that, in FIG. 8, configuration elements similar to those in FIG. 6 and FIG. 7 are denoted by the same reference numerals and explanations thereof are omitted. Each of the relay communication stations 110 and 210 in FIG. 8 further includes an edge computing section 120 in addition to the configuration elements in FIG. 7.

The edge computing section 120 is configured with, for example, a compact computer, and can perform various types of information processing relating to a radio relay and the like in the relay communication stations 110 and 210 of the HAPSs 10 and 20, by executing the preinstalled program.

For example, the edge computing section 120 determines a transmission destination of a data signal based on the data signal received from a terminal apparatus located in the three-dimensional cells 41 and 42, and performs a process of switching a relay destination of communication based on the determination result. More specifically, in case that a transmission destination of the data signal outputted from the base-station processing section 119 is a terminal apparatus located in the own three-dimensional cells 41 and 42, instead of passing the data signal to the modem section 118, the edge computing section 120 returns the data signal to the base-station processing section 119 so that the data signal is transmitted to a terminal apparatus of the transmission destination located in its own three-dimensional cells 41 and 42. On the other hand, in case that the transmission destination of the data signal outputted from the base-station processing section 119 is a terminal apparatus located in a cell other than the own three-dimensional cells 41 and 42, the edge computing section 120 passes the data signal to the modem section 118 to transmit to the feeder station 70 so that the data signal is transmitted to a terminal apparatus of the transmission destination located in the other cell of the transmission destination via the mobile communication network 80.

The edge computing section 120 may perform a process of analyzing information received from a large number of terminal apparatuses located in the three-dimensional cells 41 and 42. This analysis result may be transmitted to the management apparatus 85 provided in the mobile communication network 80, or the server 86 such as HAPS management server or application server (App server) as a management apparatus.

Duplex methods of uplink and downlink for radio communication with a terminal apparatus via the relay communication stations 110 and 210 are not limited to specific methods, and may be, for example, a time division duplex method (Time Division Duplex: TDD) or a frequency division duplex method (Frequency Division Duplex: FDD). An access method for radio communication with a terminal apparatus via the relay communication stations 110 and 210 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus at the same time/same frequency, and may be an MU-MIMO (Multi-User MIMO) technology in which one base station transmits signals to plural different communication terminal apparatuses at the same time/same frequency or plural different base stations transmit signals to one terminal apparatus at the same time/same frequency.

It is noted that, in the following embodiments, although a case in which a communication relay apparatus that wirelessly communicates with the terminal apparatus 61 is either the solar-plane type HAPS 10 or the unmanned airship type HAPS 20 is illustrated and described, the communication relay apparatus may be either HAPS 10 or HAPS 20. Further, the following embodiments can be similarly applied to other aerial-floating type communication relay apparatuses other than the HAPSs 10 and 20.

A link between the HAPSs 10 and 20 and a base station 90 via a gateway station (hereinafter abbreviated as "GW station") 70 as a feeder station is referred to as a "feeder link", and a link between the HAPS 10 and the terminal apparatus 61 is referred to as a "service link". In particular, an interval between the HAPSs 10 and 20 and the GW station 70 is referred to as a "radio interval of feeder link". Further, a downlink of a communication from the GW station 70 to the terminal apparatus 61 via the HAPSs 10 and 20 is referred to as a "forward link", and an uplink of a communication from the terminal apparatus 61 to the GW station 70 via the HAPSs 10 and 20 is also referred to as a "reverse link".

Figure 9:
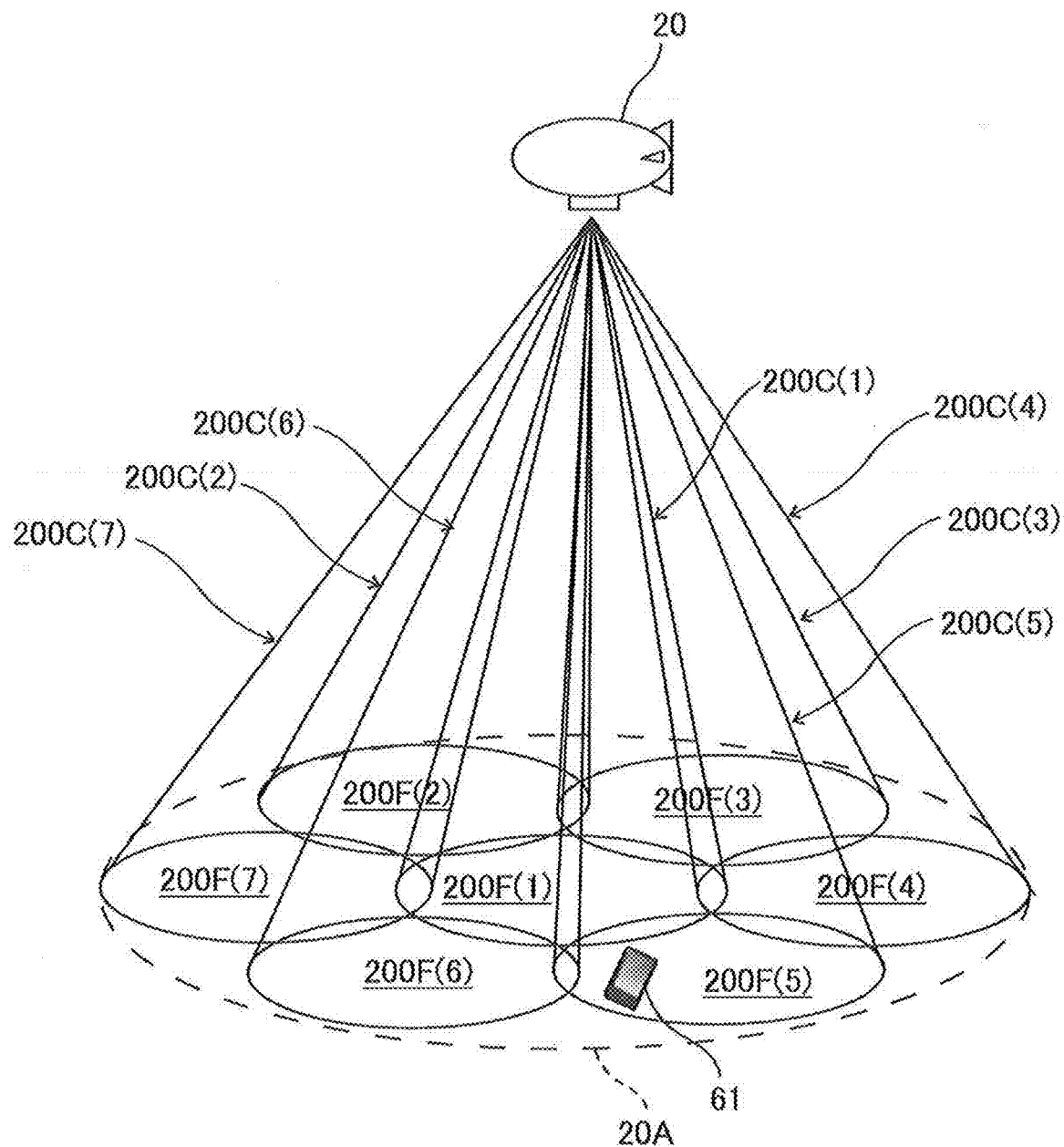
FIG. 9 is an illustration showing an example of a cell configuration of a HAPS according to the embodiment.
Figure 10A:
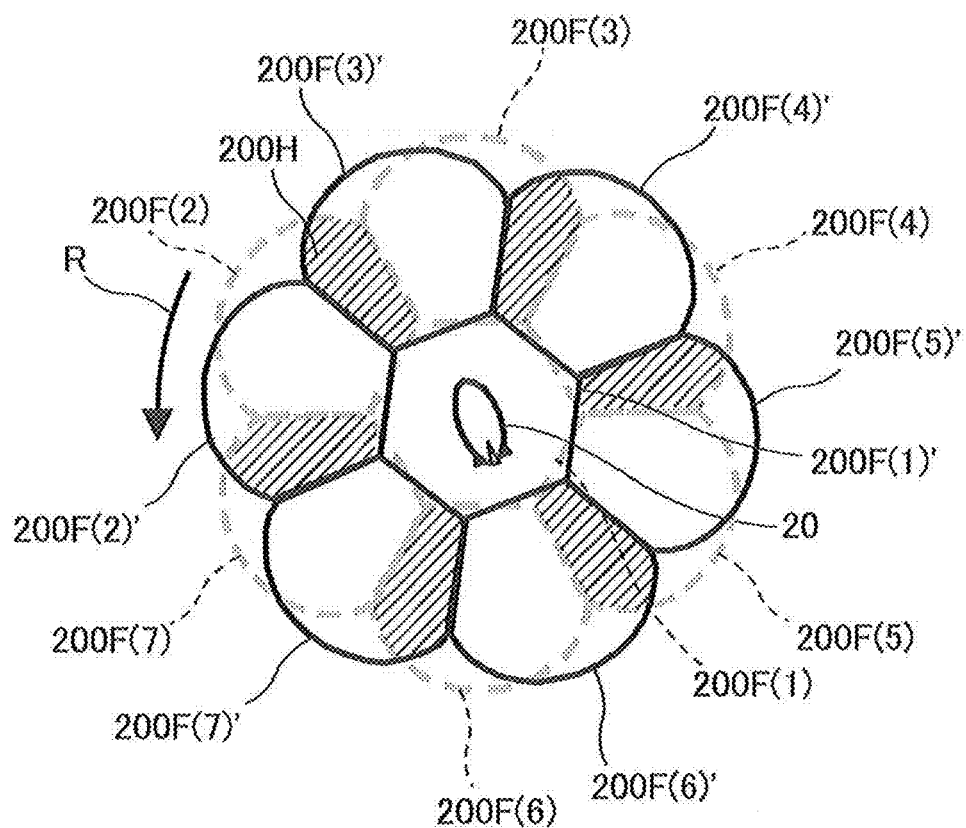
FIG. 10A is an illustration showing an example of movement of a cell footprint by turning of a HAPS according to a comparative example.
Figure 10B:
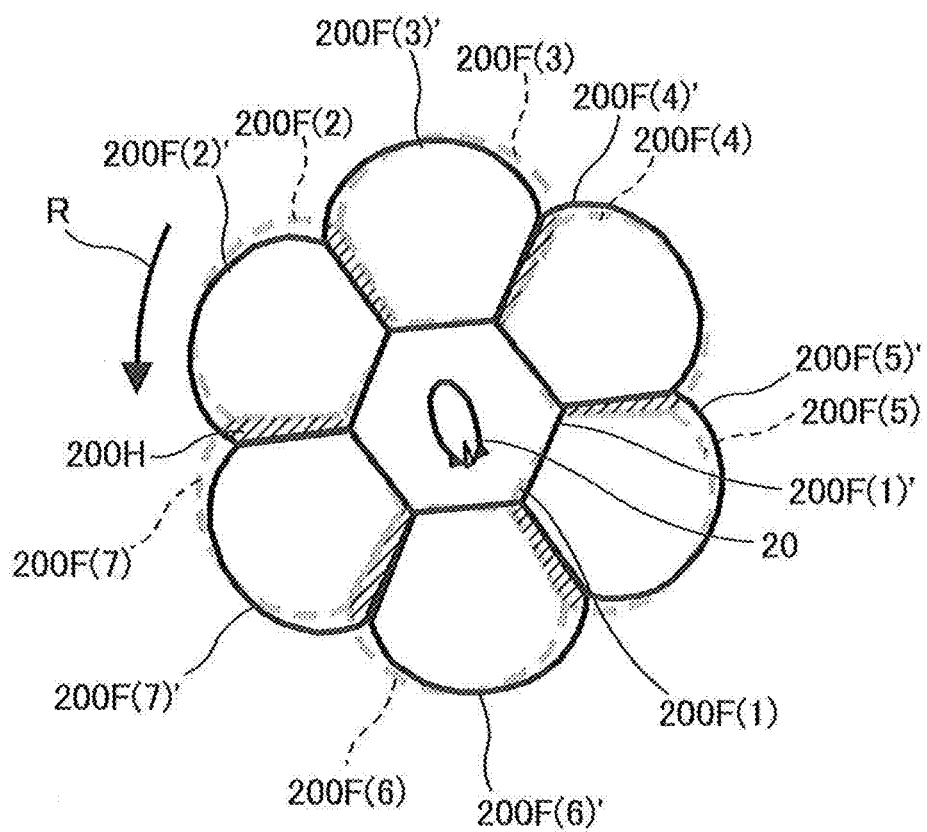
FIG. 10B is an illustration showing an example of movement of a cell footprint by turning of a HAPS according to the embodiment.

FIG. 9 is an illustration showing an example of a cell configuration of the HAPS 20 according to the embodiment. FIG. 10A is an illustration showing an example of movement of a cell footprint by turning of the HAPS according to a comparative example, and FIG. 10B is an illustration showing an example of movement of a cell footprint by turning of the HAPS according to the embodiment. In FIG. 9, FIG. 10A and FIG. 10B, although the communication relay apparatus is the unmanned-airship type HAPS 20, the communication relay apparatus may be the solar-plane type HAPS 10. Further, in the illustrated example, although the HAPS 20 is located in the stratosphere with an altitude of about 20 km, the HAPS 20 forms plural cells 200C(1) to 200C(7), and a diameter of the service area 20A configured with the plural cells (7 cells) is 100 to 200 km, it is not limited to these configuration.

In FIG. 9, a communication service for directly communicating with the terminal apparatus 61 on the ground (or on the water) using the HAPS 20 located in the stratosphere is very attractive as an expansion of service area and a communication means in the event of a disaster. The communication line of the HAPS 20 is configured with a feeder link connecting the GW station 70 and the HAPS 20, and a service link connecting the HAPS 20 and the terminal apparatus 61. In order to ensure the sufficient communication capacity in the service link, it is premised on a multi-cell configuration in which plural cells are configured by one HAPS. However, the attitude (particularly turning) and the position of the HAPS 20 fluctuate due to the influence of airflow and atmospheric pressure in an airspace such as the stratosphere. Therefore, in the multi-cell configuration as shown in FIG. 10A, it is assumed that many terminal apparatuses 61 located at a cell boundary part 200H (hatched section in the figure) in the service area are simultaneously handed over (HO) by moving footprints 200F(1) to 200F(7) of the cells 200C(1) to 200C(7) formed on the ground (or on the water), there is a possibility that the control signal increases due to the HO and the communication is interrupted due to HO failures.

Therefore, in the present embodiment, as a countermeasure against the increase in control signals due to the HO and the communication interruption due to the HO failures, a service link antenna is configured so that the footprints 200F(1) to 200F(7) do not move as shown in FIG. 10B, and a digital beamforming (DBF) control (hereinafter, also referred to as "footprint fixing control") is applied to control amplitudes and phases of digital signals with respect to signals transmitted to and received from the service link antenna, based on information on at least one of the position and the attitude (for example, with reference to a predetermined orientation) of the HAPS 20.

The information on the position and the attitude of the HAPS 20 itself may be acquired based on an output of the GPS receiver, gyro sensor, acceleration sensor, inertial sensor, etc. incorporated in the HAPS 20. For example, the information on the position and the attitude of the HAPS 20 itself may be acquired based on a output of a GNSS Inertial Navigation System (GNSS/INS) which is combining a GNSS (Global Navigation Satellite System) system and an Inertial Measurement Unit (IMU) incorporated in the HAPS 20.

Figure 11:
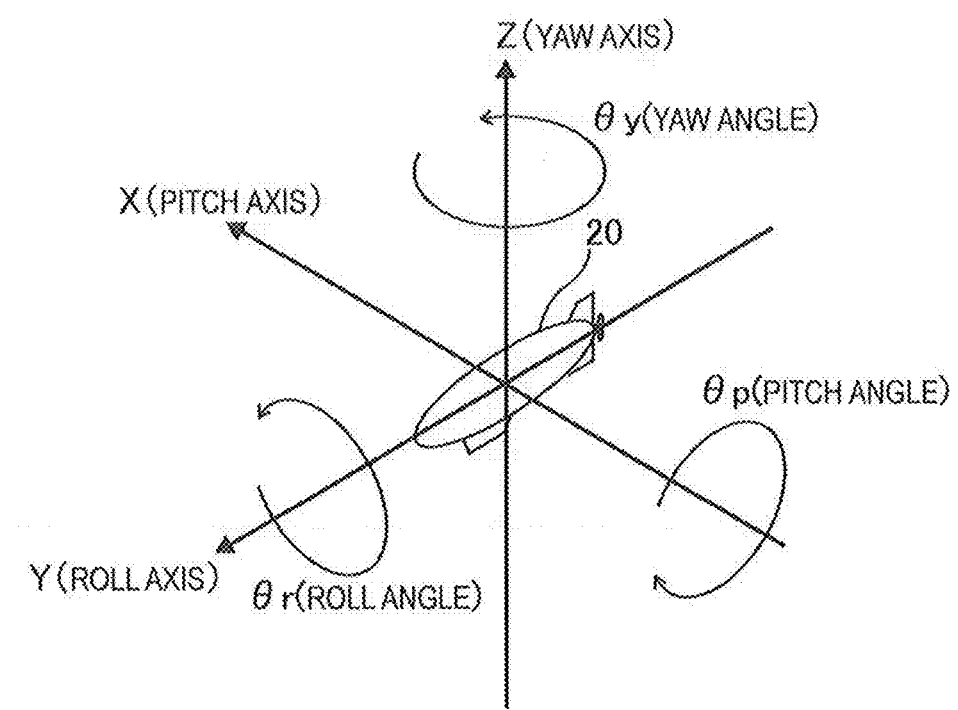
FIG. 11 is an illustration showing a definition of angles which shows an attitude change of a HAPS according to the embodiment.

FIG. 11 is an illustration showing a definition of angles indicating a change in attitude of HAPS according to the embodiment. As shown in FIG. 11, a rotation angle around the roll axis Y along the front-rear direction (forward traveling direction) of the HAPS 20 is a roll angle θr, a rotation angle around the pitch axis X along the left-right direction of the HAPS 20 is a pitch angle θp, and a rotation angle around the yaw axis Z along the vertical direction of the HAPS 20 is a yaw angle θy. In the present embodiment, since an airframe of a communication relay apparatus such as the HAPS 20 shows a three-dimensional movement (for example, changes in longitude, latitude and altitude, and rotation around the roll axis, pitch axis and yaw axis) in an upper airspace, the DBF control may be applied so as to correspond to the three-dimensional movement in consideration of, for example, the roll angle θr, the pitch angle θp and the yaw angle θy. In particular, in the present embodiment, the antenna configuration and the DBF control of the service link antenna that is resistant to the movement of the footprint due to the yawing of the HAPS 20 (rotational motion around the axis of the vertical direction of the airframe) are applied.

Each of FIG. 12A to FIG. 12C is an illustration showing an example of a turning pattern of the HAPS. As shown in FIG. 12A to FIG. 12C, a shape of a flight route may be changed depending on a wind velocity in an airspace of altitude (for example, the stratosphere) where the solar-plane type HAPS 10 is flying. For example, during almost windless as shown in FIG. 12A, a circular flight route is determined as the flight route of the HAPS 10 regardless of the direction of the wind W. Further, during mild wind blowing as shown in FIG. 12B, the flight route of the HAPS 10 is determined to be a flight route along a figure of "D" in which a circular arc portion is a straight line, so that the time zone of flight toward the direction in which the wind is blowing (against the wind W) is as short as possible. Furthermore, during strong wind blowing as shown in FIG. 12C, the flight route of the HAPS 10 is determined to be a flight route along a figure of "8" so that the time zone of flight toward the direction in which the wind is blowing (against the wind W) becomes shorter. In this case that the shape of the flight route 10F is changed depending on the strength of the wind W in the upper airspace, the DBF control may be applied so as to correspond to the turning pattern of the HAPS in the flight route 10F with the shape after changing in the present embodiment. In particular, when the HAPS flies in the turning pattern as shown in FIG. 12A to FIG. 12C, the DBF control may be applied by assuming an infinite rotation around the yaw axis Z (yaw angle changes 360 degrees) and assuming that the roll angle and the pitch angle are about ±several degrees (for example, absolute value is 10 degrees or less).

Figure 13A:
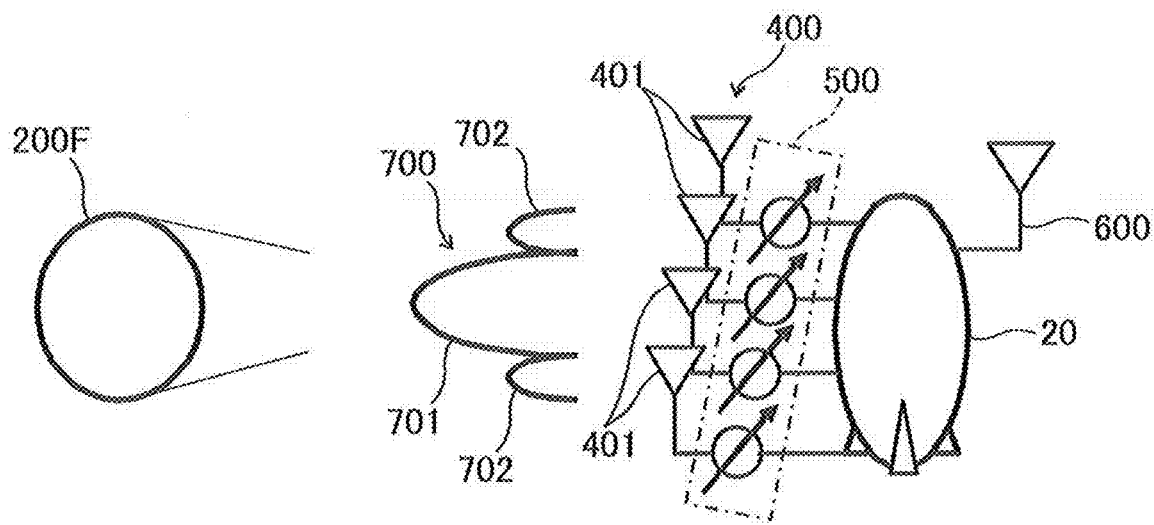
FIG. 13A is an illustration showing an example of a footprint fixing control according to the embodiment.
Figure 13B:
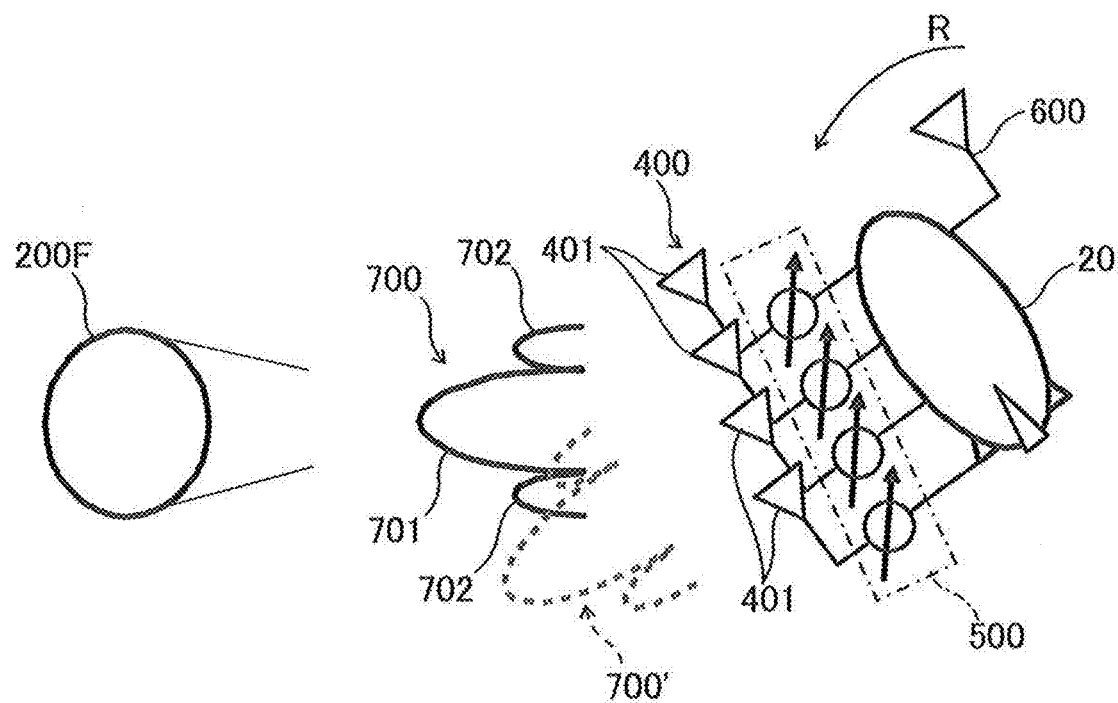
FIG. 13B is an illustration showing an example of a footprint fixing control according to the embodiment.

FIG. 13A and FIG. 13B are illustrations showing an example of a footprint fixing control according to the embodiment. FIG. 13A is a diagram before turning of the HAPS 20, and FIG. 13B is a diagram after turning when the HAPS 20 is rotated in the R direction in the figure. The HAPS 20 includes, as a service link antenna (for example, the above-mentioned 3D cell-formation antenna section 111), an array antenna 400 having plural antenna elements 401 forming a cell 200C for performing radio communication of a service link with a terminal apparatus. Further, the HAPS 20 includes a digital-beamforming (DBF) control section 500 and a GNS SANS 600 having a GPS antenna. The DBF control section 500 controls an amplitude and phase of a digital signal for a signal transmitted to and received from each antenna element 401 of the service link antenna 400, based on information on a position and an attitude of the HAPS 20 and position information on a target cell. As a result, a direction of an antenna directional beam (hereinafter, also simply referred to as "beam") 700 composed of a main beam 701 and a side lobe 702 of the array antenna 400 is controlled so as to be directed toward a target footprint formation position, and a position of the footprint 200F of the cell 200C formed by the array antenna 400 can be fixed even if the HAPS 20 rotates (turns) around the yaw axis Z. It is noted that, a beam 700' in FIG. 13B is a direction of a beam when the DBF control is not performed.

Figure 14A:
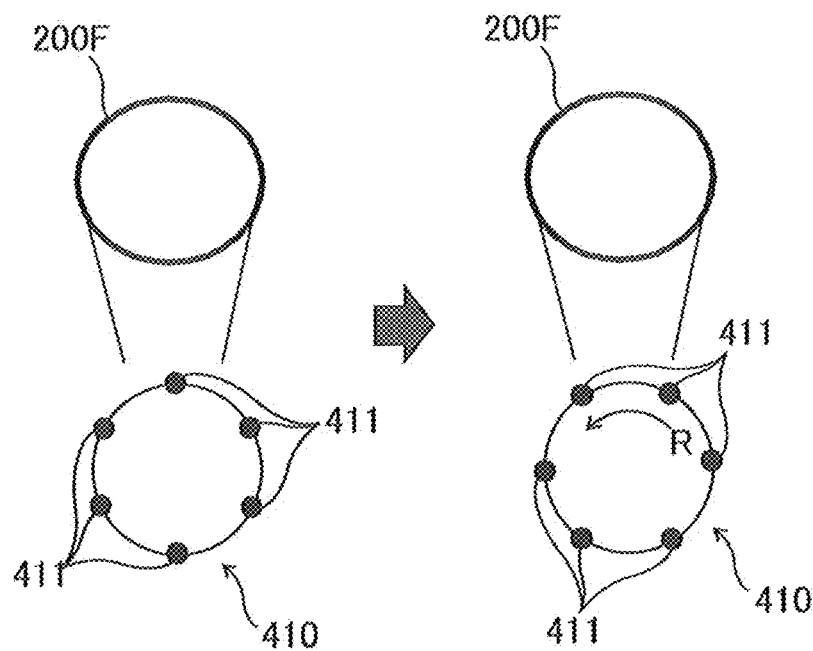
FIG. 14A is a top view illustration of an example of a circular array antenna that configures a partial function of a cylinder-type array antenna used for a footprint fixing control according to another embodiment.
Figure 14B:
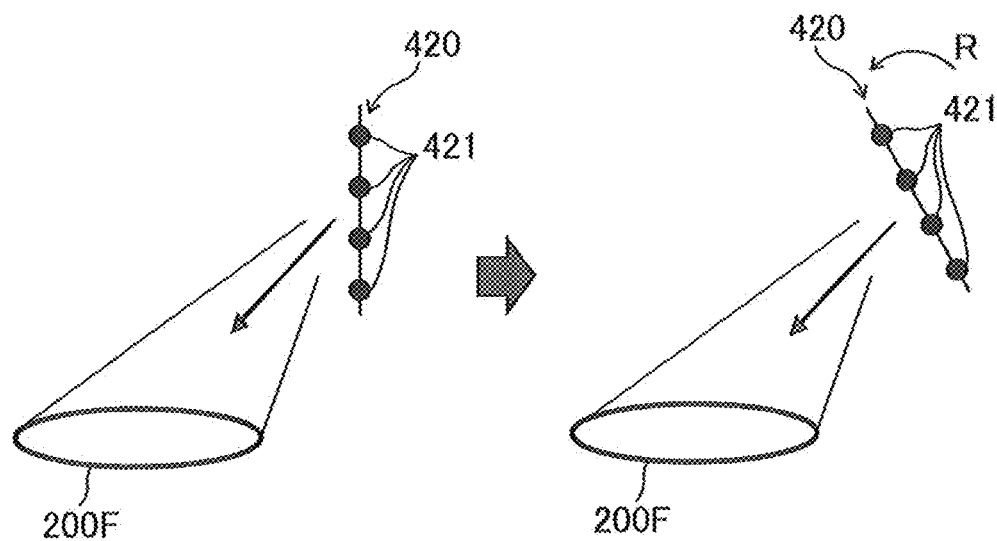
FIG. 14B is a side view illustration of an example of a linear array antenna that configures another partial function of the same cylinder-type array antenna.

FIG. 14A is a top view illustration of an example of a circular array antenna 410 that configures a partial function of a cylinder-type array antenna used for a footprint fixing control according to another embodiment. FIG. 14B is a side view illustration of an example of a linear array antenna 420 that configures another partial function of the same cylinder-type array antenna. Since the HAPS 20 may have various movements such as a vertical movement, a lateral movement and a rotation, the DBF control is required to control a direction of a directional beam of a service link antenna so as to correspond to each movement. Especially in yawing, which is a turn around the yaw axis (Z axis) among the movements of the HAPS 20, beam direction control for fixing the footprint is indispensable because the HAPS 20 rotates 360 degrees.

Therefore, in the present embodiment, the movement of the airframe of the HAPS 20 is decomposed into yaw rotation (turning) and other (roll rotation, pitch rotation and movement), a service link antenna is configured by combining the circular array antenna 410 (see FIG. 14A) considering 360 degrees infinite rotation for yaw rotation (turning) and the linear array antenna 420 (see FIG. 14B) considering ±several degrees for roll rotation and pitch rotation.

The circular array antenna 410 is an array antenna disposed so as to distribute plural antenna elements 411 along a circumferential shape. By applying the DBF control for each antenna element 411 of the circular array antenna 410, a position of the cell footprint 200F can be fixed when the airframe of the HAPS 20 performs a yaw rotation (turning) in the R direction in the figure. Since the directional beam is directed in the horizontal direction with respect to the direction toward the ground, the circular array antenna 410 is available even when the coverage is wide.

The linear array antenna 420 is an array antenna disposed so as to distribute plural antenna elements 421 in a line perpendicular to the ground. By applying the DBF control for each antenna element 421 of the linear array antenna 420, a position of the cell footprint 200F can be fixed when the airframe of the HAPS 20 performs movements (roll rotation, pitch rotation, movement, etc.) except a yaw rotation (turning) in the R direction in the figure.

Figure 15:
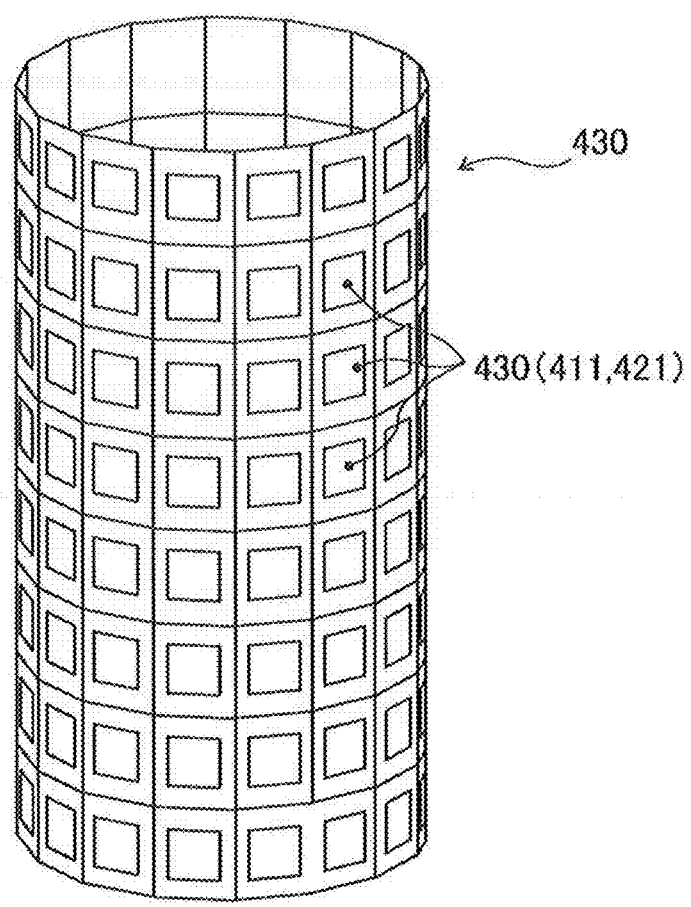
FIG. 15 is a perspective view showing a configuration example of a cylinder-type array antenna that is configured by combining a circular array antenna and a linear array antenna.

FIG. 15 is a perspective view showing a configuration example of a cylinder-type array antenna 430 that is configured by combining the circular array antenna 410 and the linear array antenna 420. The cylinder-type array antenna 430 has an antenna configuration that is particularly resistant to the movement of the footprint due to yawing. In this array antenna 430, antenna elements 431 are disposed in a circle (circular array) so that the shape of the antenna does not change when viewed from any direction in the horizontal direction, and the antenna elements 431 are linearly disposed in the vertical direction in order to correspond to the beam direction control in the lengthwise direction. It is noted that, when forming a cell directly below the HAPS 20, an antenna such as a planar array antenna may be separately provided.

In the cylinder-type array antenna 430, by using an active element as each antenna element in the horizontal direction, not only phase control for beam direction control but also power control (amplitude control) for side lobe reduction becomes possible. In the cylinder-type array antenna 430, a fixed phase may be given to each antenna element 431 and a downward fixed tilt may be applied in order to suppress an increase in weight and power consumption in the vertical direction. Further, an active element may be used like a horizontal direction as each antenna element in the horizontal direction, in this case, a vertical-beam direction control and side lobe reduction corresponding to vertical movement and lateral movement are also possible.

Figure 16:
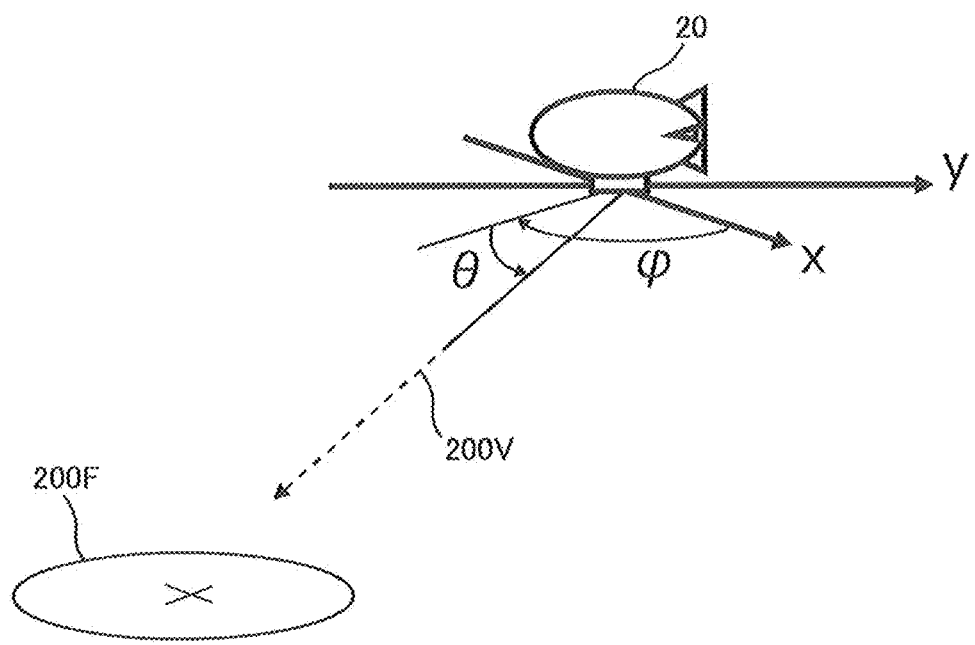
FIG. 16 is an illustration of a horizontal angle ($\phi$) and a vertical angle ($\theta$) in a footprint fixing control using a cylinder-type array antenna.
Figure 17:
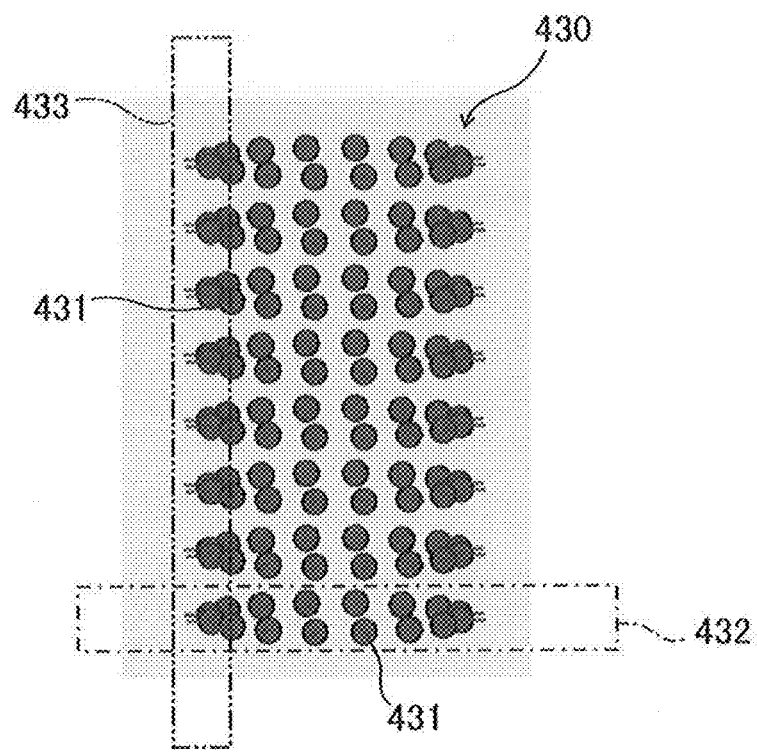
FIG. 17 is an illustration of antenna elements that perform a DBF control for each of a horizontal angle ($\phi$) and a vertical angle ($\theta$) in a cylinder-type array antenna.
Figure 18:
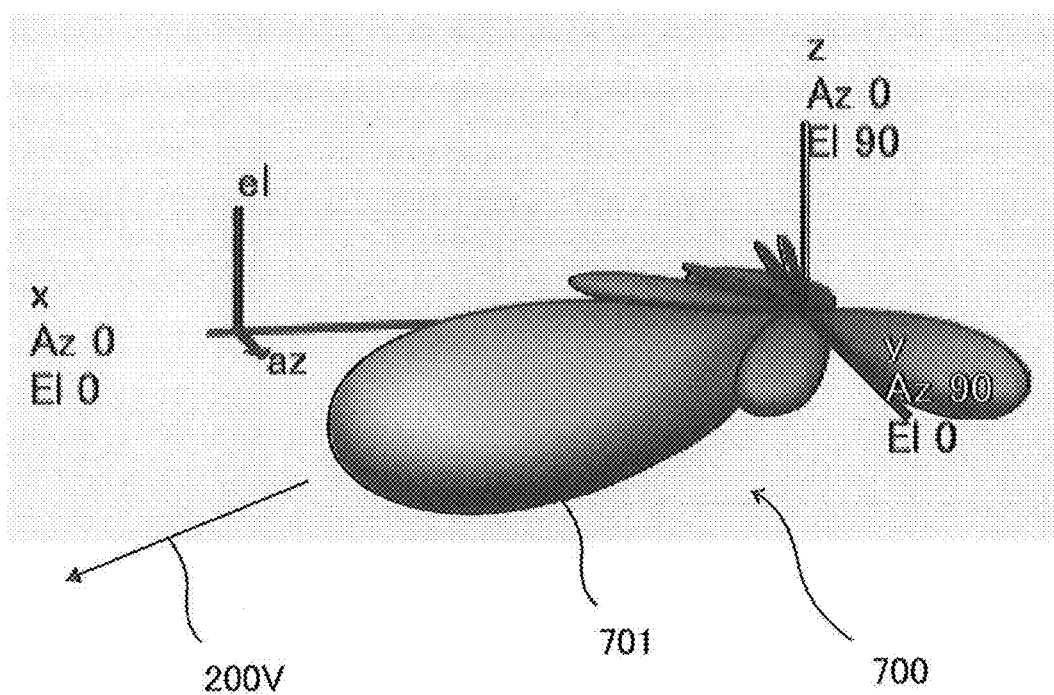
FIG. 18 is an illustration showing an example of a three-dimensional directional beam formed by a DBF control of a cylinder-type array antenna.

FIG. 16 is an illustration of a horizontal angle (φ) and a vertical angle (θ) in the footprint fixing control using the cylinder-type array antenna 430. FIG. 17 is an illustration of antenna elements that perform a DBF control for each of a horizontal angle (φ) and a vertical angle (θ) in the cylinder-type array antenna 430. FIG. 18 is an illustration showing an example of a three-dimensional directional beam formed by a DBF control of the cylinder-type array antenna 430. When the cylinder-type array antenna 430 is used, the horizontal angle (φ) and the vertical angle (θ) viewed from the array antenna 430 of the HAPS 20 are obtained with respect to the direction of the center position of the cell footprint 200F at the target position (see FIG. 16). The horizontal angle (φ) is, for example, an angle of projection vector with respect to X axis in a horizontal plane (X-Y plane in the figure) of a target beam vector 200V from the array antenna 430 toward the center of the target footprint 200F. The vertical angle (θ) is an angle with respect to horizontal plane of 0 in a vertical plane including the target beam vector 200V and the vertical direction of the HAPS 20. The DBF control (phase control) for the horizontal angle (φ) of the directional beam with respect to the target footprint 200F is performed on a lateral-antenna element group 432 disposed in the lateral direction in FIG. 17. On the other hand, the DBF control (phase control) for the vertical angle (θ) of the directional beam with respect to the target footprint 200F is performed on a vertical-antenna element group 433 disposed in the vertical direction in FIG. 17. By performing the DBF control (phase control) independently each other for the lateral-antenna element group 432 and the vertical-antenna element group 433 in this way, the directional beam 700 having the main beam 701 in the direction of the predetermined target beam vector 200V is formed as shown in FIG. 18.

Next, reduction of inter-cell interference in the plural cell configurations of HAPS 20 in the present embodiment is described.

Figure 19:
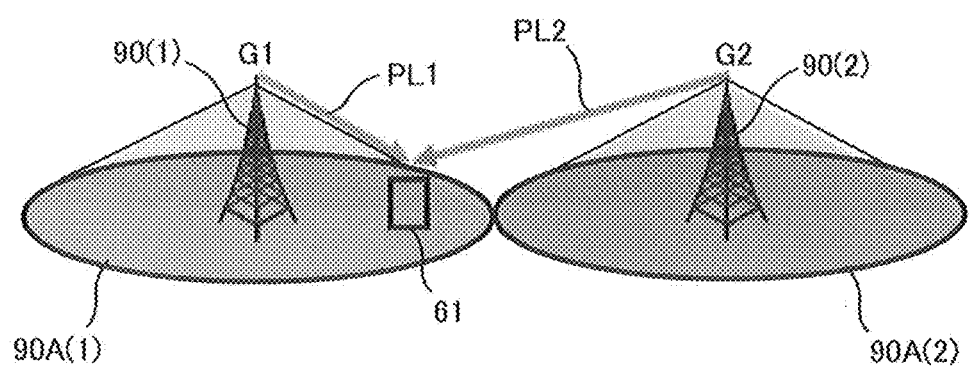
FIG. 19 is an illustration of a cell interference in a base-station network system on the ground according to a comparative example.
Figure 20:
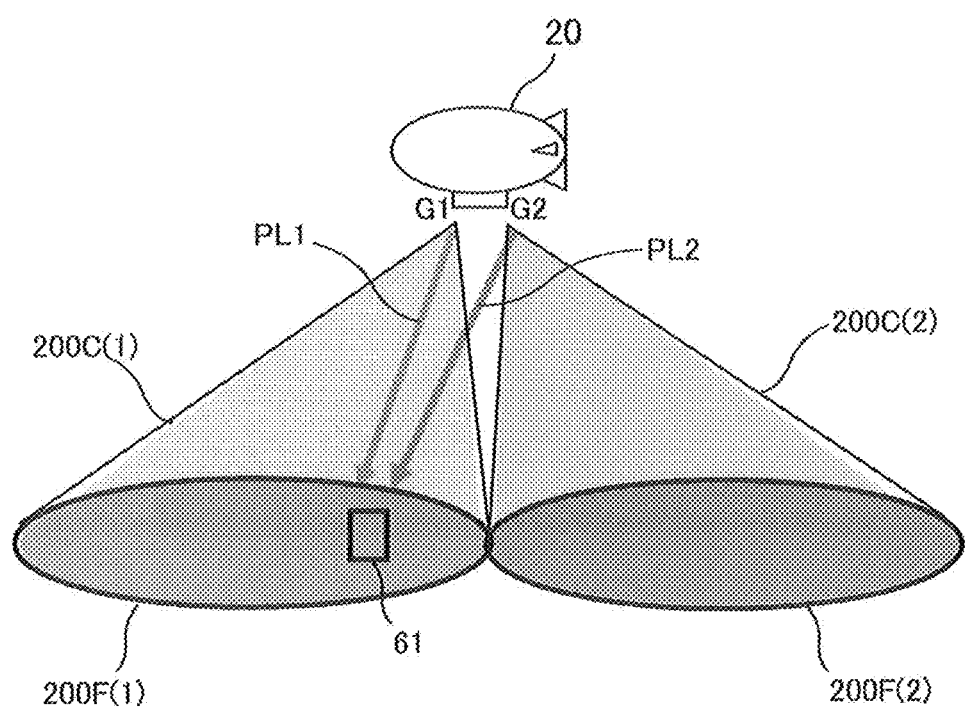
FIG. 20 is an illustration of a cell interference in a system using a HAPS according to the embodiment.

FIG. 19 is an illustration of a cell interference in a ground base-station network system according to a comparative example. FIG. 20 is an illustration of a cell interference in the system using HAPS 20 according to the embodiment.

In the ground base-station network system in FIG. 19, a desired signal Pt is transmitted from one of the base stations 90(1) among the base stations 90(1) and 90(2), in which the cells 90A(1) and 90A(2) are adjacent to each other, to the terminal apparatus 61 located at the end of the cell of the own station, and a signal Pt transmitted from the other base station 90(2) reaches the terminal apparatus 61 as an interference signal. Herein, assuming that antenna gains of the base stations 90(1) and 90(2) are G1 and G2, and propagation losses in propagation path from each of the base stations 90(1) and 90(2) to the terminal apparatus 61 are PL1 and PL2, the desired signal received by the terminal apparatus 61 is Pt+G1−PL1, the interference signal is Pt+G2−PL2, and the signal to interference power ratio (SIR: Signal to Interference Power ratio) is G1−G2+(PL2−PL1). Therefore, if PL2>>PL1, a sufficiently high SIR can be obtained.

On the other hand, in the system using HAPS 20 in FIG. 20, since the propagation losses PL1 and PL2 in the propagation path from the antenna of the cell 200C(1) and the antenna of the cell 200C(2) of communication relay station of the same HAPS 20 to the terminal apparatus 61 are almost the same (PL1=PL2), the SIR of the desired signal in the terminal apparatus 61 is G1−G2. Therefore, a sufficient antenna gain difference (G1−G2) is required to secure a high SIR. Therefore, in order to secure the sufficient antenna gain difference (G1−G2) for suppressing inter-cell interference in the system using HAPS 20, it is necessary to reduce the side lobe in each directional beam 700 of the array antenna.

The following embodiment is an example of a DBF control that continuously controls an amplitude and phase of a transmission/reception signal (digital signal) transmitted/received by an array antenna according to a desired beam directivity direction, in order to simultaneously realize beam direction control according to rotation angles of aircrafts of the HAPSs 10 and 20 and side lobe reduction to suppress inter-cell interference. Although an amplitude and phase for obtaining a beam pattern of an arbitrary waveform with respect to a desired beam direction can be obtained analytically, since matrix calculation is required for each angle and there is a concern about an increase in power consumption, an example of a DBF control capable of reducing an amount of calculation and suppressing an increase in power consumption is shown in some of the following embodiments.

Figure 21:
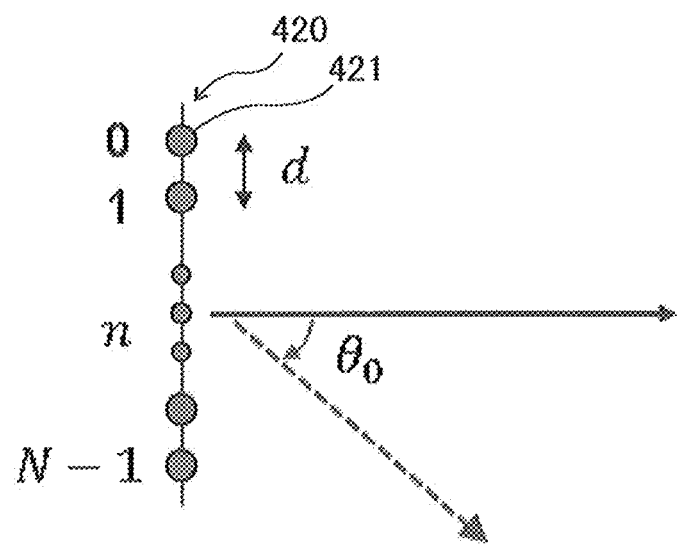
FIG. 21 is an illustration showing an example of a vertical DBF control using a linear array antenna according to the embodiment.

FIG. 21 is an illustration showing an example of a vertical DBF control using the linear array antenna 420 according to the embodiment. In FIG. 21, in the linear array antenna 420, N (n=0 to N−1) antenna elements 421 are linearly disposed at predetermined intervals d. $\theta_0$ in the figure is a desired beam directivity direction, and a downward tilt angle from a normal direction perpendicular to an alignment direction of antenna elements of the linear array antenna 420 is a positive angle. Conventional beam steering techniques and side lobe reduction methods (methods using weights such as Gaussian, Sinc, and Taylor) can be applied to the beam direction control and side lobe reduction. For example, an amplitude and phase weight w(n) applied to a transmission/reception signal (digital signal) for n-th antenna element 421 is defined as in the following equation (1).

$$w(n) = A(n)\exp(jB(n)) \tag{1}$$

Then, by using, for example, A(n) of the following equation (2) to which Gaussian is applied as the amplitude of the weight w(n), the beam width and side lobe of the directional beam can be reduced. Further, by using B(n) of the following equation (3) as the phase of the weight w(n), the direction of the main beam of the directional beam of the linear array antenna 420 can be controlled to a desired beam directivity direction $\theta_0$. It is noted that, σ in the equation (2) is a variable that determines half-value width, and λ, in the equation (3) is a wavelength of radio wave transmitted and received.

$$A(n) = \exp\left[-\frac{\{n - (N+1)/2\}^2}{\sigma^2}\right] \tag{2}$$

$$B(n) = -2\pi dn/\lambda \sin(\theta_0) \tag{3}$$

Figure 22:
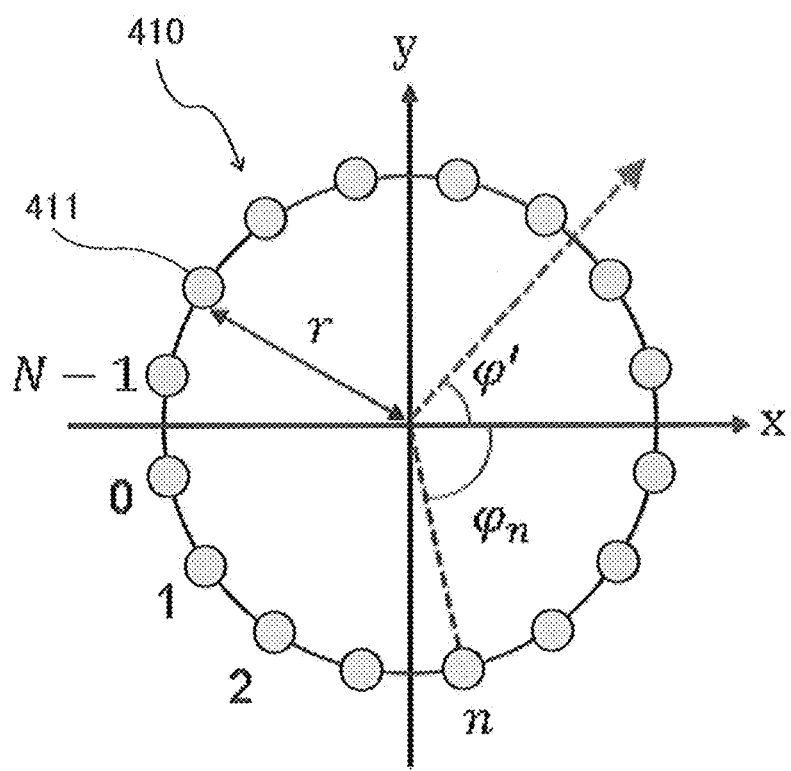
FIG. 22 is an illustration showing an example of a horizontal DBF control using a circular array antenna according to the embodiment.

FIG. 22 is an illustration showing an example of a horizontal DBF control using the circular array antenna 410 according to the embodiment. The example in FIG. 22 is an example of an optimum-control type DBF control that can realize horizontal (φ) beam direction control and side lobe reduction using the circular array antenna 410 and can obtain characteristics closest to a desired beam pattern.

In FIG. 22, the circular array antenna 410 is a circular-type array antenna disposed so as to distribute plural antenna elements 411 at predetermined angular intervals along a circumferential shape. The circular array antenna 410 is an array antenna which a shape does not change when viewed from any horizontal direction, and is suitable for controlling a beam pattern in a horizontal plane in consideration of only rotations of the HAPSs 10 and 20. Herein, a total number of antenna elements 411 is N, an element number is n (0, . . . , N−1), a radius of the circular array antenna 410 is r, and a counterclockwise direction is a positive direction of φ with a X-axis direction as a reference (0 degree). Further, a horizontal steering angle is defined as φ'. φ is an angle of n-th element.

[Complex amplitude matrix] Assuming that a complex amplitude matrix of signals transmitted and received by each antenna element 411(n) in the direction of an arbitrary angle $\varphi_m$ is F, the element $f_{mn}$ in m-th row and n-th column can be expressed by the following equation (4). However, an amplitude (antenna pattern) for each antenna element 411 is g(φ). A direction of φ=0 is a front direction of the array antenna.

$$f_{mn} = g(\varphi_m - \varphi_n) \cdot \exp\left[i\frac{2\pi}{\lambda}r\{\cos(\varphi_m - \varphi_n)\}\right] \tag{4}$$

[Weight calculation method] Further, assuming that a desired beam pattern when the steering angle is $\phi'$ is $a_{\phi'}$, a weight w of each antenna element 411 that achieves a desired beam pattern can be expressed by the following equation (5) using a matrix form. Herein, since F is not always a regular matrix, F+, which is Moore-Penrose general inverse matrix of F, is used.

$$w = F^+ a_{\phi'} \quad (5)$$

Figure 23:
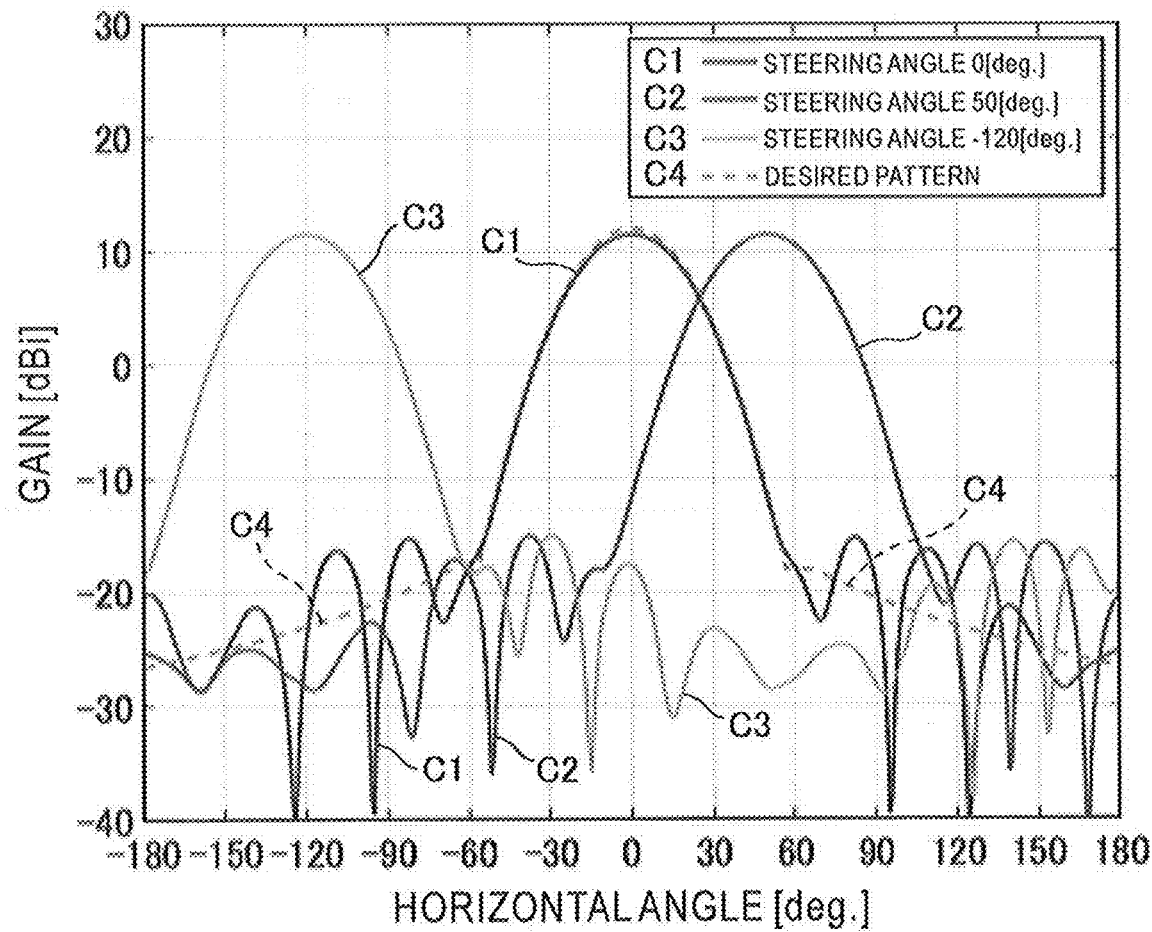
FIG. 23 is a graph showing an example of computer simulation results of a beam pattern of the circular array antenna in FIG. 22.

FIG. 23 is a graph showing an example of computer simulation results of the beam pattern of the circular array antenna 410 in FIG. 22. Table 1 shows calculation conditions. In the calculation, the number of elements of the antenna element 411 N=16, a circular array antenna with a radius of r=0.118 [m] is used, a frequency fc was set to 2 [GHz], and an element spacing was set to 0.5λ.

TABLE 1

| Parameter | Value |
| --- | --- |
| Element pattern | $\cos^m \phi$ (where m = 1.3), Half width: about 80 deg. |
| Element configuration | 16-element circular array |
| Element spacing | 0.5λ |
| Array radius | 0.118 [m] |
| Frequency | 2 [GHz] |
| Desired half width | 35 deg. |
| Desired side lobe level | 20 dBc |

FIG. 23 shows directional beam patterns C1, C2, and C3 in the horizontal plane of the circular array 410 calculated with the steering angles $\phi'$ as 0 degree, 50 degrees, and −120 degrees as an example of computer simulation. The dotted line in the figure indicates a desired beam pattern A($\phi$) at the steering angle $\phi'$=0 degree. Herein, as an example, a beam width of A($\phi$) is set to 35 degrees, and a side lobe level is set to 30 [dBc]. From FIG. 23, it can be seen that a beam having a same shape can be formed at each steering angle $\phi'$, and a desired beam width and a side lobe level of 25 [dBc] or more can be realized.

Figure 24:
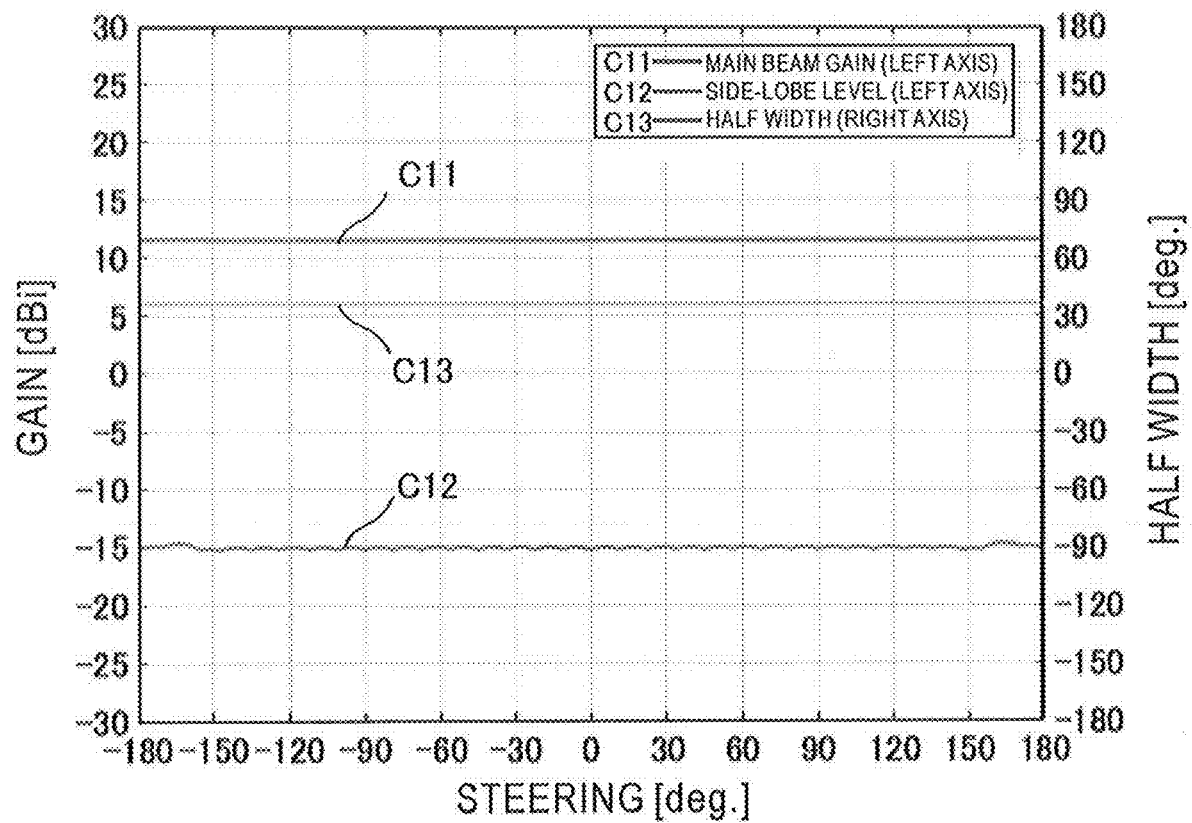
FIG. 24 is a graph showing an example of computer simulation results of a main beam gain and a maximum side lobe level when a steering angle is continuously changed in the circular array antenna in FIG. 22.

FIG. 24 is a graph showing an example of computer simulation results of a main beam gain and a maximum side lobe level when the steering angle is continuously changed in the circular array antenna 410 in FIG. 22. From FIG. 24, regardless of the steering angle $\phi'$, it can be seen that the main beam gain of about 11 [dBi] and the side lobe level of 25 [dBc] or more can always be secured.

As described above, according to the embodiments in FIG. 22 to FIG. 24, regardless of the direction in which the beam of the circular array antenna 410 is directed, the desired beam can be formed so as to keep the half-value width, gain, and side lobe level constant.

Since the weights of the array antenna are displayed in the complex number format (amplitude and phase), the amount of calculation is large and the power consumption is high if the weights are calculated from the inverse matrix each time. Therefore, weights may be accurately calculated in advance for plural steering angles $\phi$ using the above inverse matrix, an approximate expression that approximates the relationship between the weights and the steering angles $\phi$ may be created, and the information on the approximate expression may be stored in a storage section such as a memory. Then, the positions and the attitudes (including orientations) of the aircrafts of the HAPSs 10 and 20 may be detected by information acquisition means such as GNSS/INS, the target steering angle (angle for forming the directional beam) $\phi$ in the direction in which the beam (three-dimensional cell) of the service link is formed may be determined based on the value of the detection result, and weight amplitude and phase values may be calculated from the above-mentioned approximate expression created and held in advance based on the target steering angle $\phi$. By calculating the weight amplitude and phase values using the approximate expression held in the storage section in this way, it is possible to reduce power consumption by reducing the amount of calculation.

For example, with $\phi$ as the steering angle (direction in which the beam is formed), each of amplitude Amp($\phi$) and phase Phase($\phi$) of the weight is approximated by the following equations (6) and (7), and coefficients $a_1$ to $a_6$ and $b_1$ to $b_6$ of the approximate expression are stored in a storage section such as a memory.

$$\text{Amp}(\phi) = a_6 \phi^6 + a_5 \phi^5 + a_4 \phi^4 + a_3 \phi^3 + a_2 \phi^2 + a_1 \phi + a_0 \quad (6)$$

$$\text{Phase}(\phi) = b_6 \phi^6 + b_5 \phi^5 + b_4 \phi^4 + b_3 \phi^3 + b_2 \phi^2 + b_1 \phi + b_0 \quad (7)$$

Then, by determining the steering angle (angle forming the directional beam) from the information on the positions and the attitudes (including the orientations) of the aircrafts of HAPSs 10 and 20, and substituting the steering angle $\phi$ into the above approximate equations (6) and (7), the weight (amplitude and phase) can be calculated by a simple calculation.

Figure 25A:
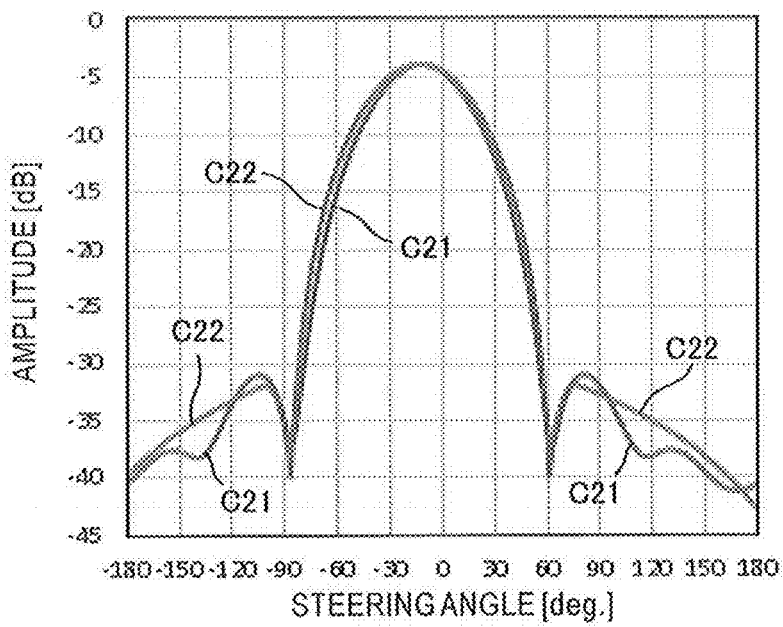
FIG. 25A is a graph showing an example of computer simulation results of an amplitude of a weight when a steering angle is continuously changed in the circular array antenna in FIG. 22.
Figure 25B:
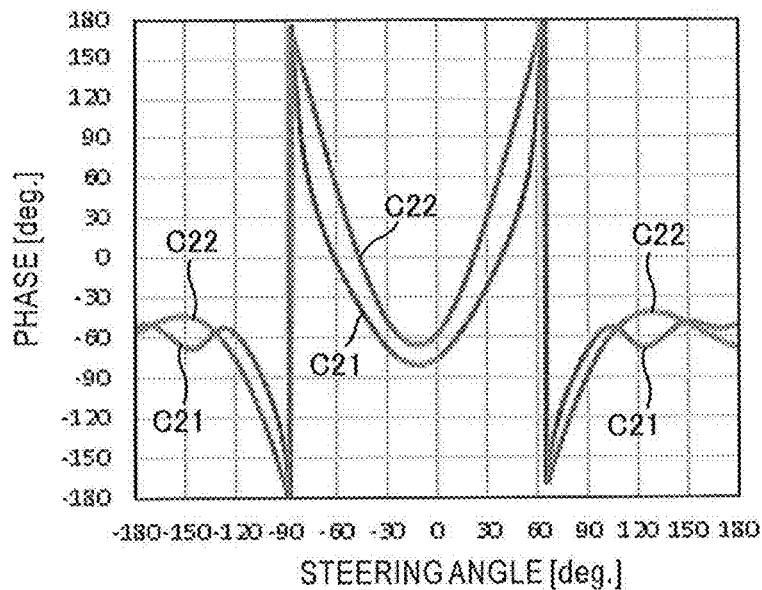
FIG. 25B is a graph showing an example of computer simulation results of a phase of a weight when a steering angle is continuously changed in the circular array antenna in FIG. 22.

FIG. 25A and FIG. 25B are graphs showing an example of computer simulation results of amplitude and phase of the weight when the steering angle is continuously changed in the circular array antenna 410 in FIG. 22. Curve C21 in the figure is computer simulation results of the amplitude and phase of the weight calculated by using the above equation (5) including the inverse matrix, and Curve C22 in the figure is computer simulation results of the amplitude and phase of the weight calculated by using the above approximate equations (6) and (7). From FIG. 25A and FIG. 25B, even when the above approximate expression is used, it can be seen that the same weight as in the case of using the above equation (5) including the inverse matrix can be obtained.

Figure 26:
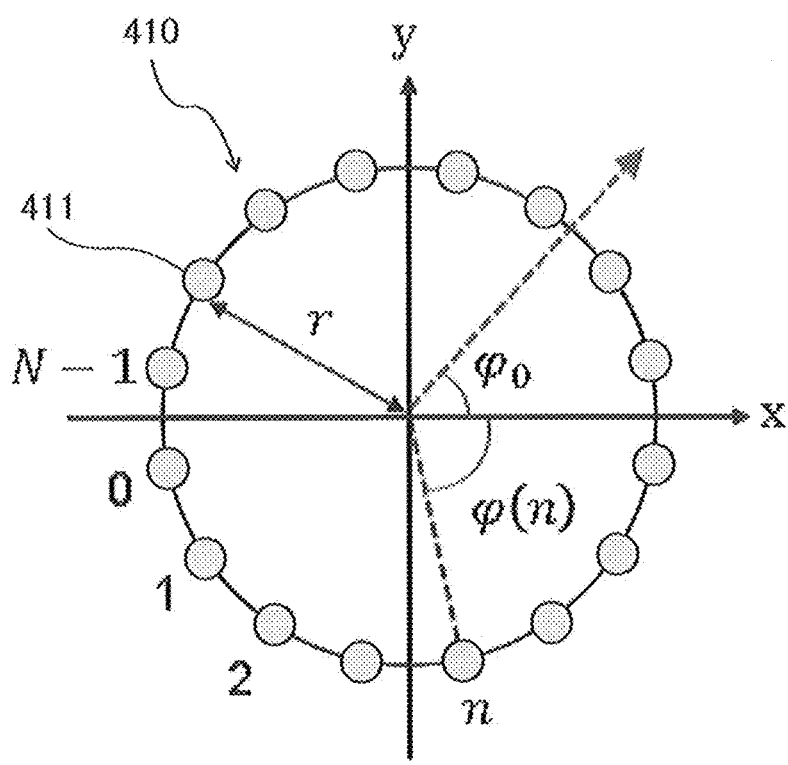
FIG. 26 is an illustration showing another example of a horizontal DBF control using a circular array antenna according to the embodiment.

FIG. 26 is an illustration showing another example of a horizontal DBF control using the circular array antenna 410 according to the embodiment. The example in FIG. 26 is an example of a DBF control that requires a small amount of calculation and can easily realize horizontal ($\phi$) beam direction control and side lobe reduction using the circular array antenna 410. It is noted that, explanations of configuration elements similar to those in FIG. 22 described above are omitted.

When the weighting with respect to the n-th antenna element 411 of the circular array antenna 410 in the figure is w(n)=A(n) exp(jB(n)) as shown in the above equation (1), the weighting for amplitude (A(n)) and the weighting for phase (B(n)) are as shown in the following equations (8) and (9), respectively. For the range of $\phi > \pi/2$ as shown in the equation (8), that is, the angular range in the back direction opposite to the desired directional beam, the weight amplitude A(n) is set to zero so that transmission is not performed.

$$A(n) = \begin{cases} 0, & \varphi > \pi/2 \\ \exp(-\varphi^2/\sigma^2), & \varphi \leq \pi/2 \end{cases} \quad (8)$$

$$B(n) = -2\pi r/\lambda \cos(\varphi) \quad (9)$$

However, $\phi = |\phi(n) - \phi_0| (0 \leq \phi \leq \pi)$, n=0 to N−1 (N is the number of antenna elements), $\phi(n)$ is the placement angle of n-th antenna element, $\phi_0$ is the desired beam angle, and r is the radius of the circular array antenna 410. Further, σ is a variable that determines the half-value width.

Figure 27:
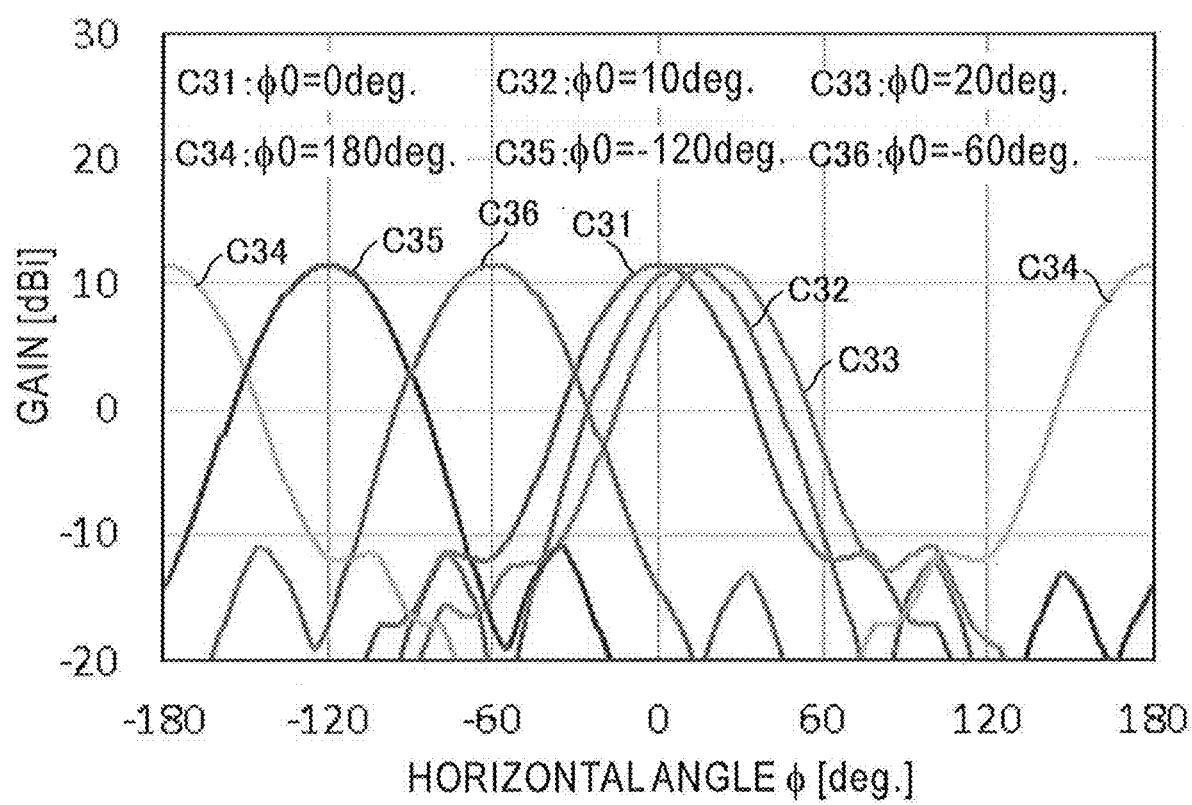
FIG. 27 is a graph showing an example of computer simulation results of a beam pattern of the circular array antenna in FIG. 26.

FIG. 27 is a graph showing an example of computer simulation results of the beam pattern of the circular array antenna 410 in FIG. 26. In the calculation, the number of elements N=16 and the radius r=0.19 [m] of the antenna element 411 was used as a circular array antenna, the frequency fc was set to 2 [GHz], the element spacing was set to 0.5λ, and σ was set to 0.5 (equivalent to half-value width 35 degrees). The element spacing of the antenna elements was set evenly in the range of φm=−168.75 degrees to 168.75 degrees. Further, the beam pattern of each antenna element was set to $\cos^m \phi$ (however, m=1.3, 0 in the range of 90 degrees<φ and φ<−90 degrees).

FIG. 27 shows, as an example of computer simulation, directional beam patterns C31, C32, C33, C34, C35, and C36 in the horizontal plane of the circular array 410 calculated with the steering angles $\phi_0$ as 0 degree, 10 degrees, 20 degrees, 180 degrees, −120 degrees (=240 degrees), and −60 degrees (=300 degrees). As shown in FIG. 27, it can be seen that the beam direction can be controlled with almost no change in the beam shape in any direction in the horizontal plane. From the above, assuming that the yawing rotation angle of an airframe of the HAPS is $\phi_{Yaw}$, it is possible to fix the cell footprint by giving the rotation angle ($\phi_0 = -\phi_{Yaw}$) in the opposite direction to the aircraft. Further, when plural cells are multiplexed in the horizontal direction with one array antenna, it can be realized by setting different $\phi_0$ for each cell and multiplexing. For example, when 6 cells are formed every 60 degrees in the horizontal direction, $\phi_0$(m)=mπ/3−$\phi_{Yaw}$ (however, cell number m=0 to 5).

A computer simulation evaluation of the number of handovers (HO) was performed using the above-described cylinder-type array antenna 430 in FIG. 15 among the antenna configurations in the above embodiment. In the simulation evaluation, in one HAPS and 7-cell configuration (center 1 cell, peripheral 6 cells), the number of HO is evaluated when the DBF control using the weights of the above equations (8) and (9) is not applied ($\phi_{Yaw}$=0) and when it is applied. Herein, for the sake of simplicity, HAPS is assumed to perform only the rotational movement of yawing, and as an example, it is assumed that one rotation is performed in 10 minutes (0.6 degrees rotation per second). Table 2 shows the evaluation specifications of the antenna configuration.

TABLE 2

| Parameter | peripheral 6 cells | Center 1 cell |
| --- | --- | --- |
| Element pattern | cosk φ(where k = 1.3) , Half width: about 80 deg. | |
| Element configuration | 16 horizontal elements, 8 vertical elements, cylinder-type array | 4 x 4 elements, planar array |
| Element spacing | horizontal/vertical 0.5λ | 0.5λ |
| Half width | horizontal 35 deg., vertical 20 deg. | horizontal/vertical 70 deg. |
| Tilt angle | 17 deg. | 90 deg. (direction directly below) |

The peripheral 6 cells are formed by the cylinder-type array antenna 430 described above, and the central 1 cell is formed and covered by the downward plane array antenna. Each of the vertical direction of the cylinder-type array antenna 430 and the planar array antenna gives different amplitudes to each antenna element so as to have the half-value width shown in Table 2.

In order to suppress the frequent occurrence of HO, HO is not performed if the ratio of the received power of the adjacent cell to the in-service cell is within 3 dB, and HO is performed to the adjacent cell when the ratio exceeds 3 dB. The area within the circle with the altitude of HAPS of 20 [km] and the radius of 100 [km] was set as the evaluation target area, the HO rate generated per second (ratio of the number of handed over UE to all UE (terminal apparatuses) in the 100 [km] area) was evaluated when the DBF control was not applied and when it was applied, and it was 0.96% when it was not applied and 0% when it was applied (no HO occurred).

As shown above, by applying the antenna configuration such as the circular array antenna or the cylinder-type array antenna in the present embodiment and the DBF control using the weight calculated based on the information on the positions and the attitudes of the HAPSs 10 and 20, it is possible to suppress the movement of the cell footprint due to changes in the attitudes and the positions such as yawing rotation of the HAPSs 10 and 20. Therefore, it is possible to suppress the frequent occurrence of HO (a phenomenon in which a large number of terminal apparatuses are handed over all at once) due to the movement of the footprint, and suppress the increase in control signals due to HO and the communication interruption due to HO failures.

Figure 28:
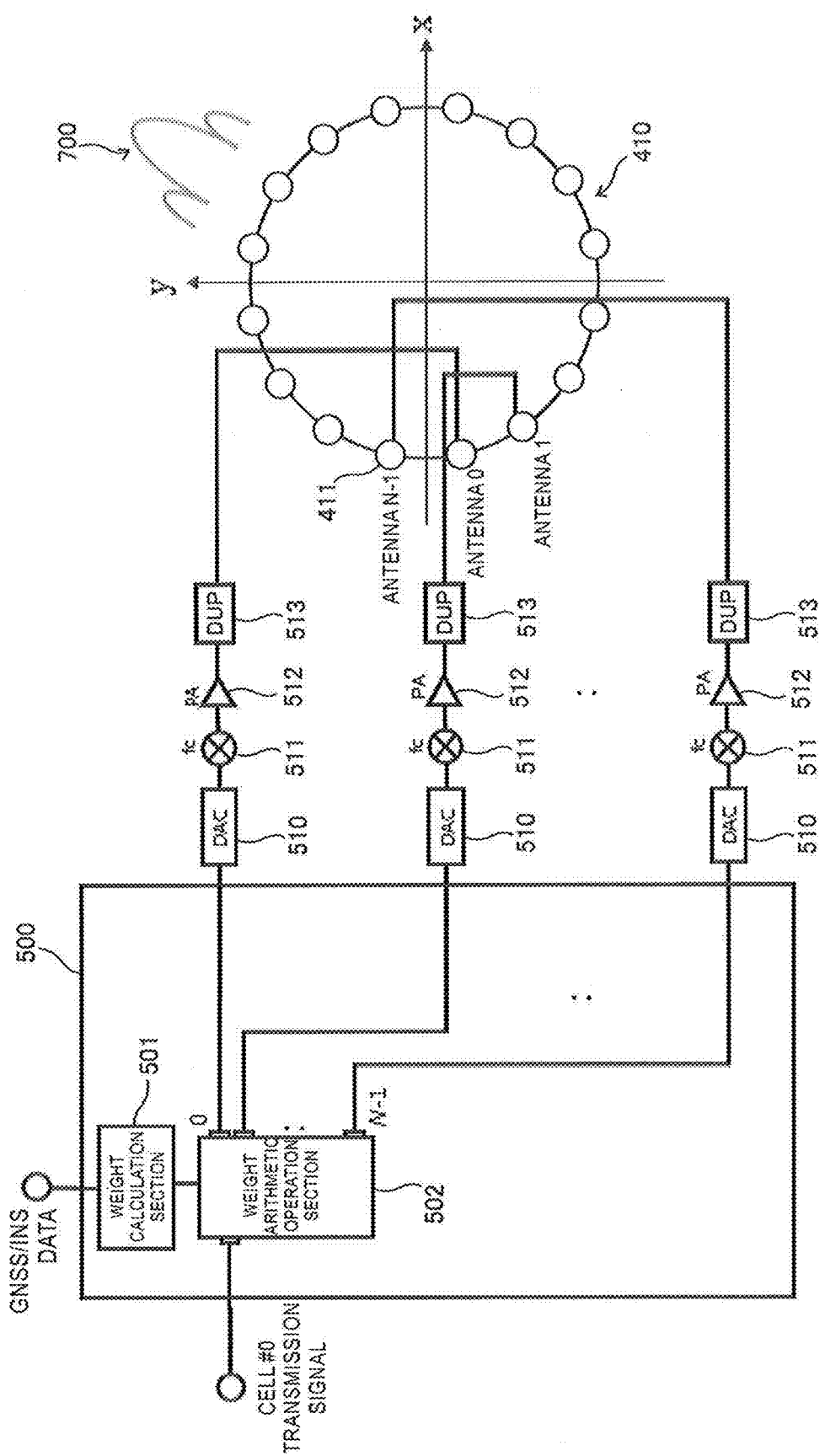
FIG. 28 is a block diagram showing an example of an antenna configuration and a control system of a DBF control according to the embodiment.

FIG. 28 is a block diagram showing an example of an antenna configuration and a control system of a DBF control according to the embodiment. The example in FIG. 28 is an example in which one cell (#0) is formed by a circular array antenna 410 consisting of N antenna elements 411. In FIG. 28, for simplification of the illustration, only the downlink is described for the downlink and the uplink. Further, in FIG. 28, although only one polarization (single polarization) of horizontal polarization and vertical polarization is described, a similar DBF control section is additionally provided when transmitting and receiving signals of the other polarization.

The DBF control section 500 includes a weight calculation section 501 and a weight arithmetic operation section 502. The weight calculation section 501 calculates the above-mentioned weight (amplitude and phase vector data) applied to the transmission signal (digital baseband signal) transmitted by the plural antenna elements 411 (0 to N−1) of the circular array antenna 410, based on the position and the attitude data of the HAPSs 10 and 20 acquired by GNSS/INS and the position information on the target cell.

The weight arithmetic operation section 502 generates plural digital transmission signals (0 to N−1) corresponding to the plural antenna elements 411 (0 to N−1) by applying the weight calculated by the weight calculation section 501 to the digital transmission signal. Each of the plural digital transmission signals (0 to N−1) output from the weight arithmetic operation section 502 is converted to an analog signal by a DA converter (DAC) 510, converted to a predetermined transmission frequency fc by a frequency converter 511, and amplified to a predetermined power by a power amplifier (PA) 512, and then supplied to the corresponding antenna elements 411 (0 to N−1) via a transmission/reception duplexer (DUP: DUPlexer) 513.

By the above DBF control, the antenna directional beam 700 can be formed from the circular array antenna 410 toward the target position, and the transmission signals can be transmitted to the terminal apparatuses located in the cell with the footprint fixed.

It is noted that, in FIG. 28, the reception signals of the plural uplinks received by each of the plural antenna elements 411 (0 to N−1) of the circular array antenna 410 are amplified by a low noise amplifier via the DUP 513, and then converted to a predetermined frequency by a frequency converter, converted to digital signals by an AD converter (ADC), and supplied to the weight arithmetic operation section 502. By applying the plural weights to the plural digital signals by the weight arithmetic operation section 502 and then adding them to each other, it is possible to generate reception signals from the terminal apparatus located in the predetermined cell.

In FIG. 28, the weight arithmetic operation section 502 may have a function of antenna switching control.

Figure 29:
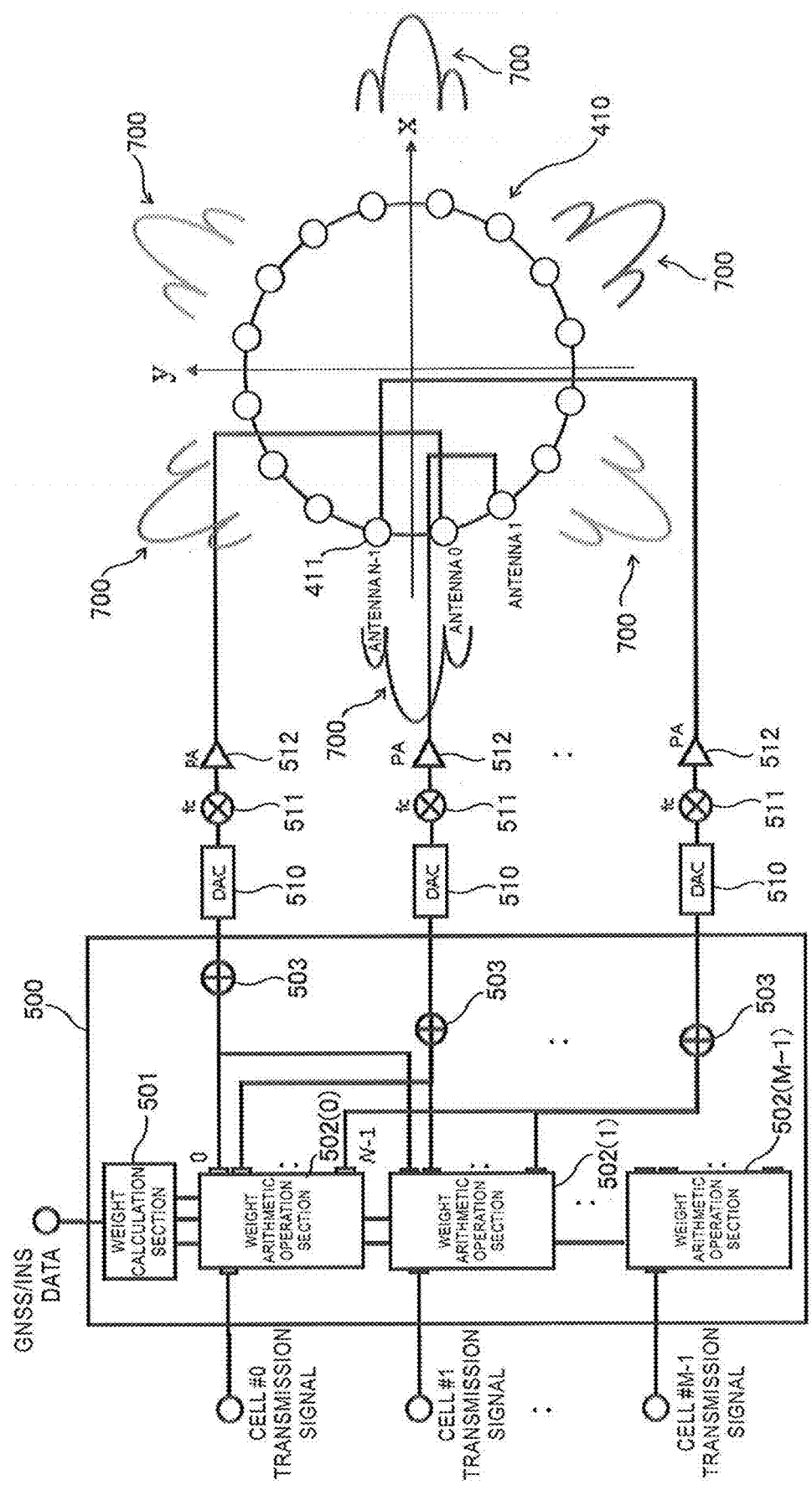
FIG. 29 is a block diagram showing another example of an antenna configuration and a control system of a DBF control according to the embodiment.

FIG. 29 is a block diagram showing another example of an antenna configuration and a control system of a DBF control according to the embodiment. The example in FIG. 29 is an example in which M cells (#0 to #M−1) are formed by the circular array antenna 410 consisting of N antenna elements 411. It is noted that, in FIG. 29, explanations of configuration elements similar to those in FIG. 28 are omitted.

In FIG. 29, the DBF control section 500 includes a weight calculation section 501 and M weight arithmetic operation sections 502 corresponding to M cells (#0 to #M−1). The weight calculation section 501 calculates weights for the number of cells supplied to each of the plural weight arithmetic operation sections 502. The weights calculated herein are matrices, not vectors.

Each of the plural weight arithmetic operation sections 502 applies the weight calculated by the weight calculation section 501, and performs a weight arithmetic operation for performing beamforming for each cell to generate and output plural digital transmission signals to be supplied to each of the N antenna elements 411. The digital transmission signals output from the weight arithmetic operation sections 502 are multiplexed (added) for each antenna element, so that beam control in different directions can be performed for plural cells at the same time.

In the DBF control in FIG. 29, the antenna directional beam 700 can be formed from the circular array antenna 410 toward each of plural different target positions, and the transmission signals can be transmitted to the terminal apparatuses located in each cell with the footprint fixed.

Figure 30:
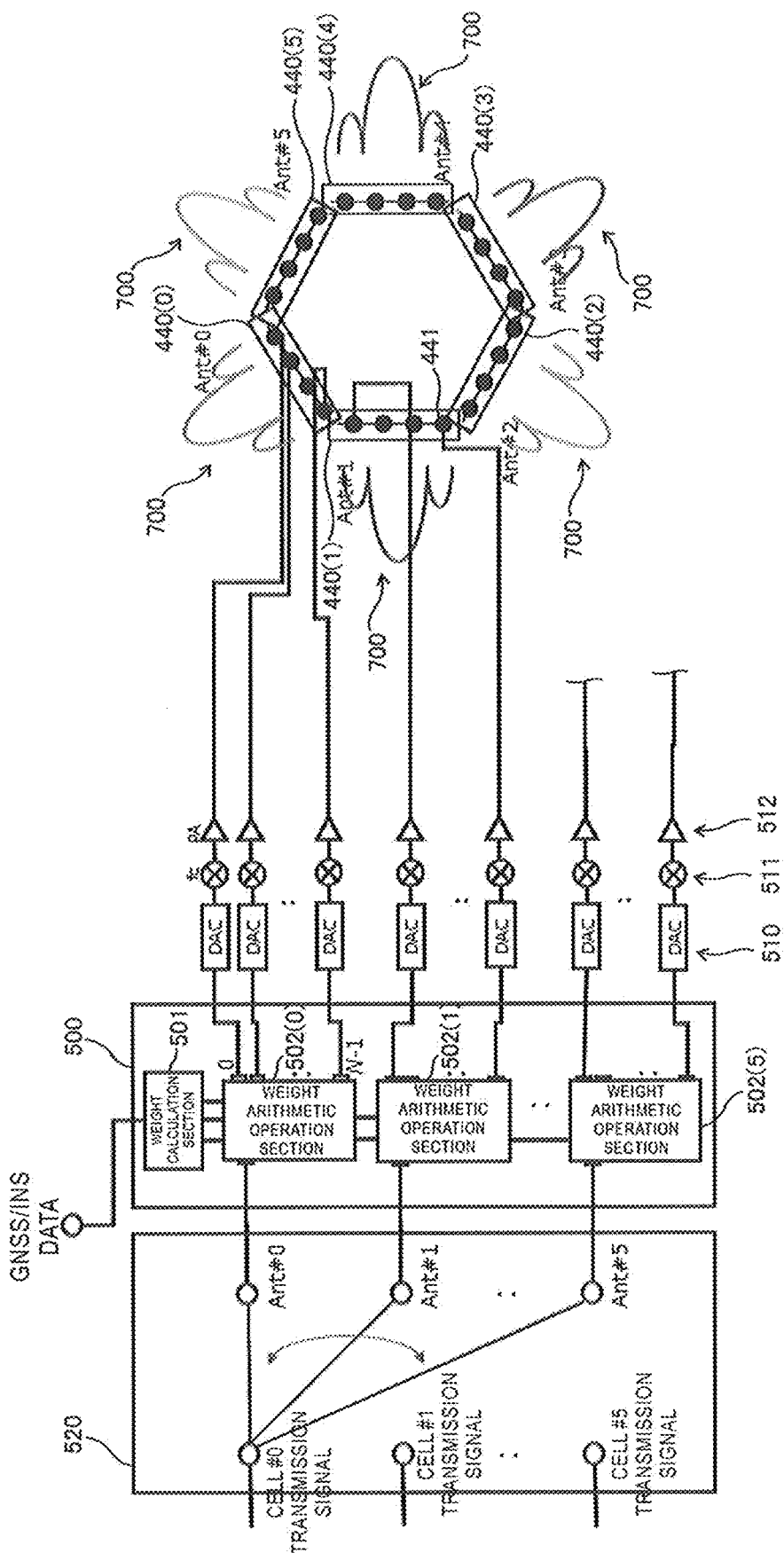
FIG. 30 is a block diagram showing yet another example of an antenna configuration and a control system of a DBF control according to the embodiment.

FIG. 30 is a block diagram showing yet another example of an antenna configuration and a control system of a DBF control according to the embodiment. The example in FIG. 30 is an example in which an antenna switching and a DBF control are performed by the planar array antennas 440(0) to 440(5) as six planar array antennas, and footprint fixing control corresponding to yaw rotation of the HAPSs 10 and 120 is performed to form six cells (#0 to #M−1). Each planar array antenna 440(0) to 440(5) has N antenna elements 441, and is disposed so that the directions of the beams of the respective array antennas are different from each other. It is noted that, in FIG. 30, explanations of configuration elements similar to those in FIG. 28 are omitted.

In FIG. 30, the DBF control section 500 includes the weight calculation section 501 and six weight arithmetic operation sections 502(0) to 502(5) provided so as to correspond to the six planar array antennas 440(0) to 440(5). It is noted that, the number of each of the planar array antenna 440 and the weight arithmetic operation section 502 may be other than six.

Further, in the example of FIG. 30, an antenna switching section 520 is provided in addition to the DBF control section 500. The antenna switching section 520 switches the planar array antennas 440(0) to 440(5) forming each of the six cells (#0 to #M−1) between the planar array antennas 440(0) to 440(5). For example, the connection to the weight arithmetic operation sections 502(0) to 502(5) is switched so as to switch the planar array antenna forming the first cell (#0) between the planar array antennas 440(0) to 440(5).

Figure 31:
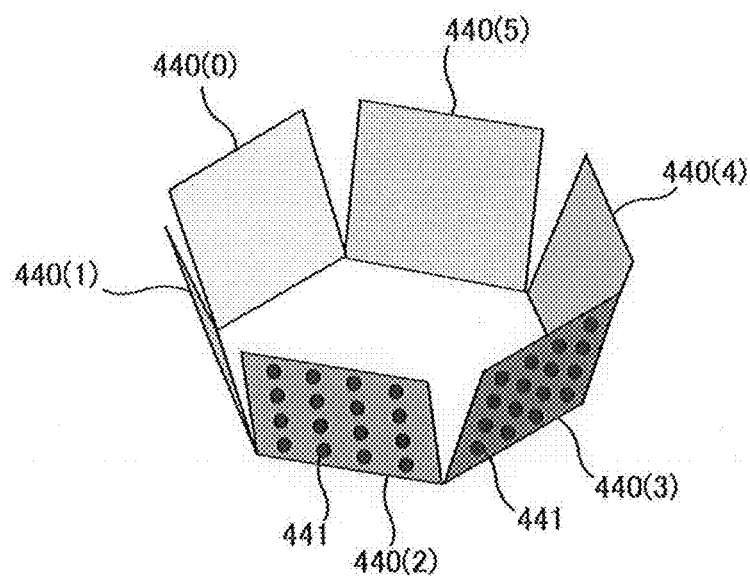
FIG. 31 is a perspective view showing an example of a planar array antenna according to the embodiment.

FIG. 31 is a perspective view showing an example of the planar array antennas 440(0) to 440(5) controlled by the DBF control in the control system in FIG. 30. In the illustrated example, each of the six planar array antennas 440(0) to 440(5) is disposed so that plural antenna elements 441 are two-dimensionally distributed along the planar shape. Further, the planar array antennas 440(0) to 440(5) are disposed on each of the six slopes having a downward pyramid shape (hexagonal pyramid shape). A bottom surface may be provided at the lower end of the plural pyramid shapes (hexagonal pyramid shape), and the planar array antenna 440 for forming a cell in the downward direction may be provided on the bottom surface. Further, the plural planar array antennas 440 may be disposed on each of the plural outer surface sections in a prismatic shape (for example, a hexagonal prism shape).

The DBF control by the control system in FIG. 30 is performed as follows, for example. In the horizontal DBF control, by performing phase control on each planar array antenna 440(0) to 440(5), the directional beam of each planar array antenna 440(0) to 440(5) is steered in a predetermined angle range (for example, 30 degrees) in the horizontal direction (lateral direction). Then, when an angle to swing with steering reaches the limit, for example, when the directional beam is steered up to ±30 degrees with respect to the vertical normal direction of each planar array antenna by phase control, the planar array antennas 440(0) to 440(5) corresponding to each cell are switched. On the other hand, the vertical DBF control is, for example, performed in the same manner as the vertical control in the cylinder-type array antenna 430 described above.

Figure 32:
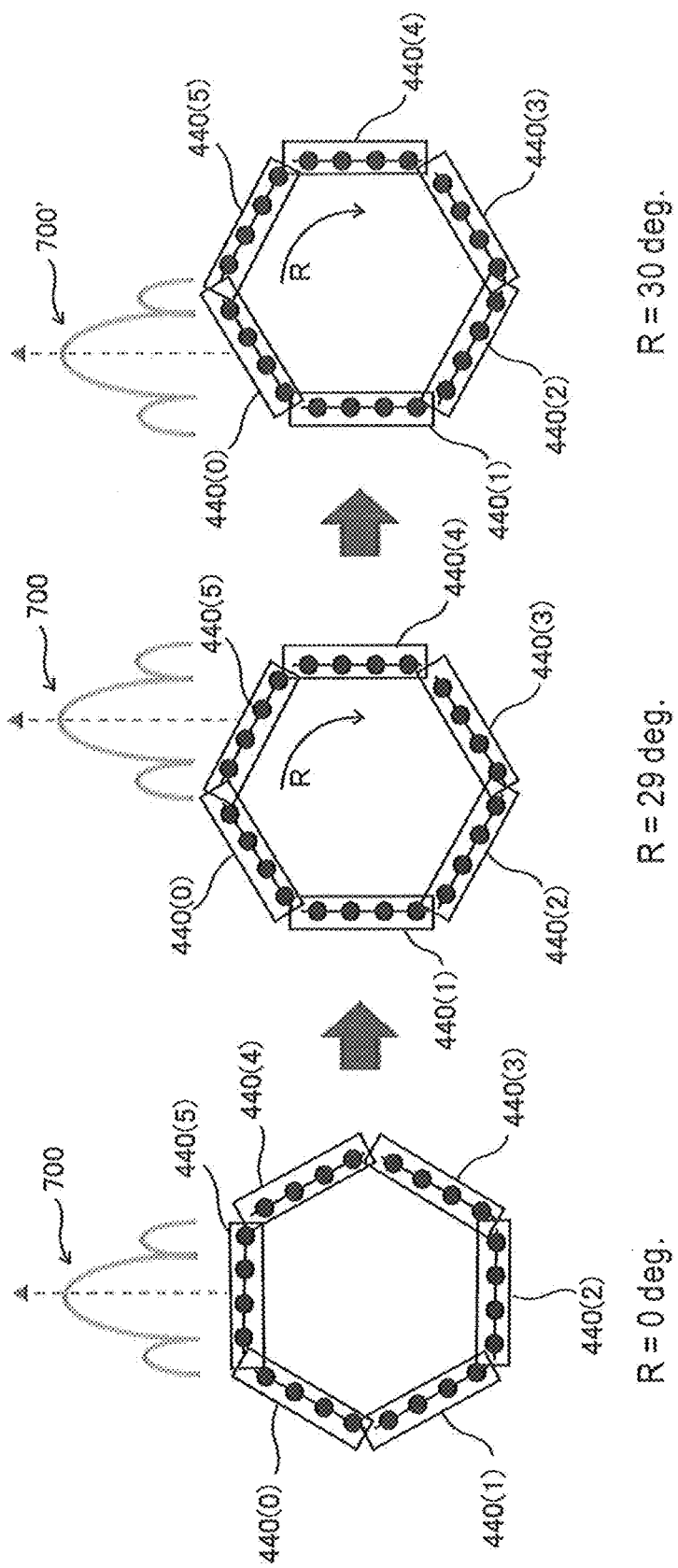
FIG. 32 is an illustration showing an example of a horizontal beamforming control of a planar array antenna.

FIG. 32 is an illustration showing an example of horizontal beamforming control of the planar array antennas 440(0) to 440(5). The example in FIG. 32 is an example when the aircrafts of the HAPSs 10 and 20 are rotating clockwise. In the state before rotation on the left side in the figure, a cell is formed by the beam 700 in the upper part in the figure in the normal direction of the planar array antenna 440(5). When the aircraft rotates (turns) in the clockwise direction indicated by the arrow R in the figure, for example, at 29 degrees or less, from this state, as shown at the center in the figure, the beam 700 is steered in the counterclockwise direction by the phase control of the planar array antenna 440(5), and the cell position is maintained. Then, as shown in the state on the right in the figure, when the aircraft rotates (turns) in the clockwise direction indicated by the arrow R in the figure, for example, by 30 degrees or more of the threshold value, it becomes difficult to steer the beam 700 by the phase control of the planar array antenna 440(5). For the reason, by switching the planar array antenna for forming the cell from the planar array antenna 440(5) to the adjacent planar array antenna 440(0), and performing phase control on the planar array antenna 440(0) after the switching, the beam 700 is steered clockwise direction to maintain the cell position.

It is noted that, in the example in FIG. 30, by applying the weight including the antenna switching, the DBF control including the antenna switching process may be performed by the weight arithmetic operation section 502 without separately providing the antenna switching section 520.

Figure 33:
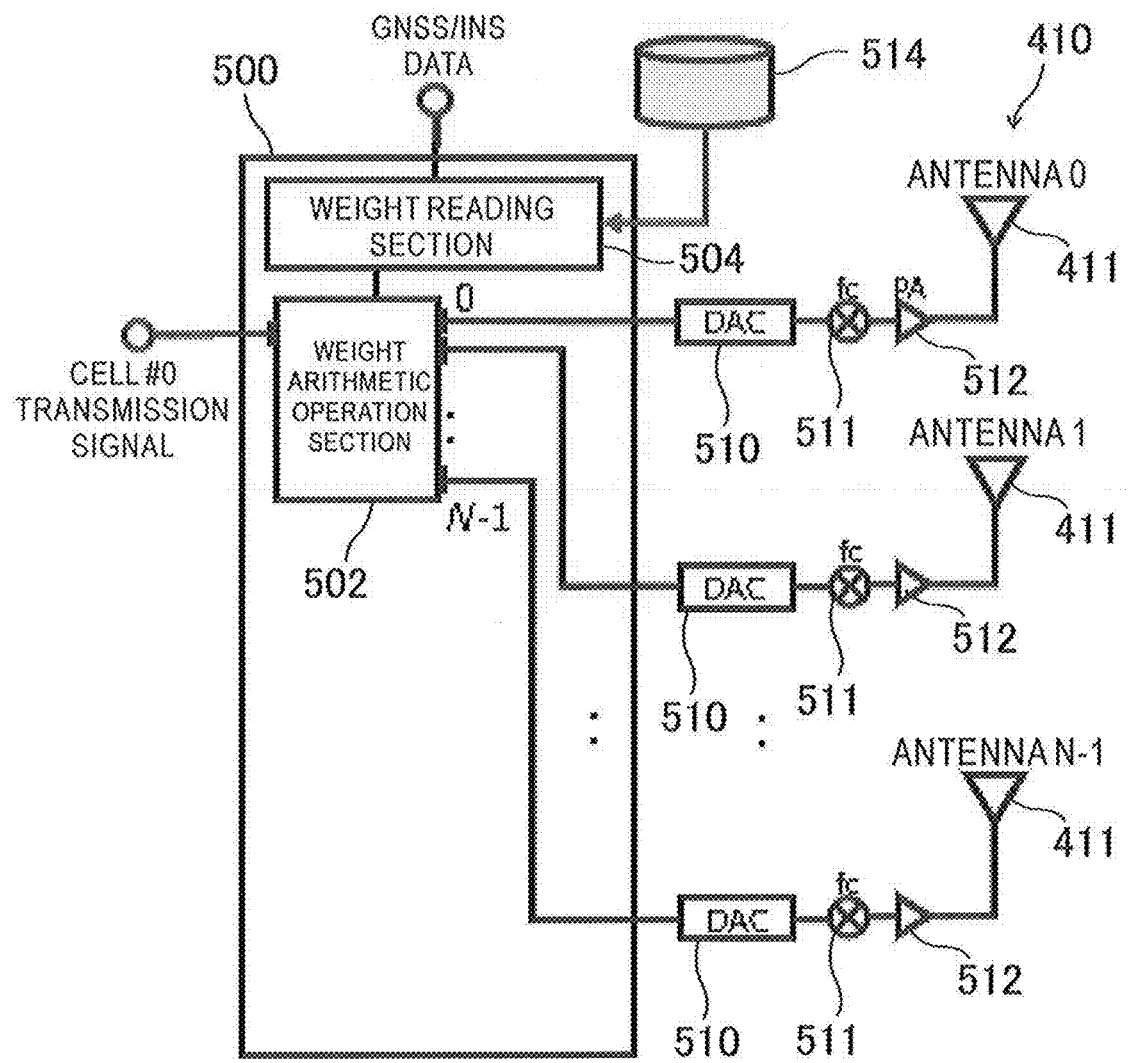
FIG. 33 is a block diagram showing yet another example of an antenna configuration and a control system of DBF control according to the embodiment.

FIG. 33 is a block diagram showing yet another example of an antenna configuration and a control system of the DBF control according to the embodiment. It is noted that, in FIG. 33, explanations of configuration elements similar to those in FIG. 28 are omitted.

In the control system in FIG. 33, note that the rotation of the aircrafts of the HAPSs 10 and 20 is a repetitive motion of the same rotation and movement (with periodicity), weights corresponding to the positions and the attitudes (tilt angles and orientations) of multiple sets of aircraft that differ from each other in the predicted movement paths of the HAPSs 10 and 20 on the basis of the position of the service area are calculated in advance and stored in a storage section 514 such as a memory. Then, a weight reading section 504 refers to the storage section 514 based on the attitudes and the positions of the aircrafts calculated from the GNS SANS data, reads the weights corresponding to the calculated attitudes and positions of the aircrafts, and the weights are used for the calculation of the transmission signal in the weight arithmetic operation section 502. In the example in FIG. 33, since s sequential weight calculation is unnecessary, the calculation amount and the power consumption can be significantly reduced.

As described above, according to the present embodiment, by applying the array antenna having the above configuration and the DBF control, it is possible to suppress the movement of the cell footprint due to changes in the attitudes and the positions of the HAPSs 10 and 20, and suppress the frequent occurrence of HO, the increase in control signals due to HO and the communication interruption due to HO failures. Moreover, because the directional beam of the array antenna is controlled by the DBF control, which is small and easy to reduce weight, instead of a large and heavy mechanical control mechanism, the HAPSs 10 and 20 can be miniaturized.

The DBF control in each of the above embodiments may be independently determined and performed by the HAPSs 10 and 20, or may be performed by a control command from an external apparatus such as the remote control apparatus 85 or the server 86. Further, the DBF control may be performed periodically at predetermined time intervals, or may be performed when the movement distances or the attitude changes of the HAPSs 10 or 20 become larger than predetermined those.

It is noted that, the process steps and configuration elements of the relay communication station of the communication relay apparatus such as the HAPSs 10 and 20, the feeder station, the gateway station, the management apparatus, the monitoring apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, relay communication station, feeder station, gateway station, base station, base station apparatus, relay-communication station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar plane type)
20 HAPS (airship type)
20A service area
70 gate way station (GW station)
80 mobile communication network
90, 90(1), 90(2) base station (eNodeB)
100A cell
110, 210 relay communication station
200C, 200C(1) to 200C(7) three dimensional cell
200F, 200F(1) to 200F(7) footprint
400 array antenna
401, 411, 421, 431 antenna element
410 circular array antenna
420 linear array antenna 430 cylinder-type array antenna
432 lateral-antenna element group
433 vertical-antenna element group
440 planar array antenna
441 antenna element
500 DBF control section
501 weight calculation section
502 weight arithmetic operation section
503 accumulator
504 weight reading section
514 storage section
520 antenna switching section
600 GNSS/INS (GPS antenna)
700 antenna directional beam
701 main beam
702 side lobe

The invention claimed is:

1. An aerial-staying type communication relay apparatus for performing a radio communication with a terminal apparatus, comprising:
an array antenna having plural antenna elements forming a cell for performing a radio communication of a service link with the terminal apparatus;
an information acquisition section for acquiring information on at least one of a position and an attitude of the communication relay apparatus; and
a control section for controlling phases and amplitudes of plural transmission/reception signals transmitted/received via each of the plural antenna elements of the array antenna so as to fix a position of a cell footprint, based on the information on at least one of the position and the attitude of the communication relay apparatus, the information being acquired by the information acquisition section,
wherein the array antenna is a cylinder-type array antenna in which plural antenna elements are disposed to be distributed at equal intervals over a whole of a cylindrical peripheral surface of a main body with a cylindrical peripheral surface shape, and
wherein the cylinder-type array antenna is configured with plural sets of circular-type array antennas disposed in a direction parallel to a central axis of the cylindrical peripheral surface, each of the circular array antennas having plural antenna elements disposed in a circumferential direction of the cylindrical peripheral surface.

2. The communication relay apparatus according to claim 1,
wherein the communication relay apparatus forms plural cells of configuring a service area and controls the phases and the amplitudes of the plural transmission/reception signals so as to fix each of footprints of the plural cells.

3. The communication relay apparatus according to claim 1,
wherein the communication relay apparatus:
obtains a target horizontal angle of an antenna directional beam from a predetermined vertical plane and a target vertical angle of the antenna directional beam from a predetermined horizontal plane so as to fix the cell footprint with reference to an orientation of a reference direction preset in the communication relay apparatus; and
controls the phases and the amplitudes of the plural transmission/reception signals independently of each other, for each of the circular-type array antenna having the plural antenna elements disposed in the circumferential direction of the cylindrical peripheral surface and a linear-type array antenna having the plural antenna elements disposed in the direction parallel to the central axis of the cylindrical peripheral surface.

4. The communication relay apparatus according to claim 1,
wherein a planar-type array antenna is further disposed on a bottom surface portion of the cylinder-type array antenna, the planar-type array antenna having plural antenna elements disposed so as to be two-dimensionally distributed along a planar shape.

5. The communication relay apparatus according to claim 3,
wherein the communication relay apparatus:
obtains a target horizontal angle of an antenna directional beam from a predetermined vertical plane so as to fix the cell footprint with reference to an orientation in a reference direction preset in the communication relay apparatus;
calculates a weight w applied to each of the plural transmission/reception signals for the plural antenna elements, by obtaining an inverse matrix $F^+$ in a following matrix equation (1) where $a_{\phi'}$ is a desired beam pattern when a steering angle $\phi'$; and
controls phases and amplitudes of the plural transmission/reception signals based on the plural weights w $$w = F^+ a_{\phi'} \qquad (1)$$

6. The communication relay apparatus according to claim 3,
wherein the communication relay apparatus:
stores an approximate equation for phases and amplitudes of weights predetermined so as to obtain a desired beam pattern with respect to plural horizontal angles of an antenna directional beam from a predetermined vertical plane with reference to an orientation in a reference direction preset in the communication relay apparatus;
obtains a target horizontal angle of an antenna directional beam from a predetermined vertical plane so as to fix the cell footprint with reference to the orientation in the reference direction;
calculates a weight applied to each of the plural transmission/reception signals for the plural antenna elements based on the target horizontal angle and the approximate equation; and
controls the phases and the amplitudes of the plural transmission/reception signals based on the plural weights.

7. The communication relay apparatus according to claim 3,
wherein the communication relay apparatus:
obtains a target horizontal angle of an antenna directional beam from a predetermined vertical plane so as to fix the cell footprint with reference to an orientation in a reference direction preset in the communication relay apparatus;
calculates a weight applied to each of the plural transmission/reception signals for the plural antenna elements by the Gaussian distribution function centered on the target horizontal angle, based on the target horizontal angle; and
controls the phases and the amplitudes of the plural transmission/reception signals based on the plural weights.

8. The communication relay apparatus according to claim 1, wherein the communication relay apparatus:
- calculates and stores weights applied to the transmission/reception signals in advance by corresponding to each of multiple sets of positions and attitudes, the sets being different from each other, in a predicted movement path of the communication relay apparatus with reference to a position of a service area;
- selects a weight corresponding to the position and the attitude of the communication relay apparatus, the position and the attitude being acquired by the information acquisition section, from the stored weights respectively corresponding to the multiple sets of the absolute positions and attitudes; and
- performs a control of the phases and amplitudes of the transmission/reception signals based on the selected weights.

9. An aerial-staying type communication relay apparatus for performing a radio communication with a terminal apparatus, comprising:
- an array antenna having plural antenna elements forming a cell for performing a radio communication of a service link with the terminal apparatus;
- an information acquisition section for acquiring information on at least one of a position and an attitude of the communication relay apparatus; and
- a control section for controlling phases and amplitudes of plural transmission/reception signals transmitted/received via each of the plural antenna elements of the array antenna so as to fix a position of a cell footprint, based on the information on at least one of the position and the attitude of the communication relay apparatus, the information being acquired by the information acquisition section,
- wherein the array antenna is configured by disposing plural planar-type array antennas on each of plural outer surface sections in a pyramid shape, a prism shape or a combination thereof, each of the plural planar-type array antennas having plural antenna elements disposed so as to be two-dimensionally distributed along a planar shape, so that a beam direction of each array antenna is different from each other, and
- wherein the communication relay apparatus comprises an antenna switching section that is controlled so as to switch an array antenna used for forming the cell among the plural planar-type array antennas, and
- wherein the communication relay apparatus:
  - obtains a target horizontal angle of an antenna directional beam from a predetermined vertical plane and a target vertical angle of the antenna directional beam from a predetermined horizontal plane so as to fix the cell footprint with reference to an orientation in a reference direction preset in the communication relay apparatus;
  - performs a control of the phases and the amplitudes of the transmission/reception signals with respect to a planar-type array antenna in use, when a difference between a current horizontal angle and the target horizontal angle is less than or equal to a predetermined threshold value; and
  - switches the planar-type array antenna and performs the control of the phases and amplitudes of the transmission/reception signals, when the difference between the current horizontal angle and the target horizontal angle becomes larger than the threshold value.

10. The communication relay apparatus according to claim 9,
wherein the communication relay apparatus forms plural cells of configuring a service area and controls the phases and the amplitudes of the plural transmission/reception signals so as to fix each of footprints of the plural cells.

11. The communication relay apparatus according to claim 9,
wherein a planar-type array antenna is further disposed on a bottom surface portion in the pyramid shape, the prism shape or the combination thereof, the planar-type array antenna having plural antenna elements disposed so as to be two-dimensionally distributed along a planar shape.

12. The communication relay apparatus according to claim 9,
wherein the communication relay apparatus:
- calculates and stores weights applied to the transmission/reception signals in advance by corresponding to each of multiple sets of positions and attitudes, the sets being different from each other, in a predicted movement path of the communication relay apparatus with reference to a position of a service area;
- selects a weight corresponding to the position and the attitude of the communication relay apparatus, the position and the attitude being acquired by the information acquisition section, from the stored weights respectively corresponding to the multiple sets of the absolute positions and attitudes; and
- performs a control of the phases and amplitudes of the transmission/reception signals based on the selected weights.

* * * * *